United States Patent
Giraud et al.

(10) Patent No.: US 11,119,010 B2
(45) Date of Patent: Sep. 14, 2021

(54) ASEPTIC TAMPER EVIDENT SAMPLING CONTAINER

(71) Applicant: CSP TECHNOLOGIES, INC., Auburn, AL (US)

(72) Inventors: Jean-Pierre Giraud, Auburn, AL (US); Herve Pichot, Chennevieres-sur-Marne (FR); Franklin Lee Lucas, Jr., Opelika, AL (US); Ethan Ross Perdue, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 839 days.

(21) Appl. No.: 16/090,863

(22) PCT Filed: Jun. 10, 2016

(86) PCT No.: PCT/US2016/036852
§ 371 (c)(1),
(2) Date: Oct. 3, 2018

(87) PCT Pub. No.: WO2016/201200
PCT Pub. Date: Dec. 15, 2016

(65) Prior Publication Data
US 2019/0120730 A1    Apr. 25, 2019

Related U.S. Application Data

(60) Provisional application No. 62/174,835, filed on Jun. 12, 2015, provisional application No. 62/321,868, (Continued)

(51) Int. Cl.
*G01N 1/20* (2006.01)
*A61J 1/12* (2006.01)
(Continued)

(52) U.S. Cl.
CPC ............. *G01N 1/2035* (2013.01); *A61J 1/12* (2013.01); *A61J 1/1406* (2013.01); *A61J 1/1412* (2013.01);
(Continued)

(58) Field of Classification Search
None
See application file for complete search history.

(56) References Cited

U.S. PATENT DOCUMENTS

| | | | |
|---|---|---|---|
| 4,447,225 A * | 5/1984 | Taff | A61M 5/30 604/71 |
| RE37,676 E | 4/2002 | Abrams et al. | |

(Continued)

FOREIGN PATENT DOCUMENTS

| | | |
|---|---|---|
| WO | 2013/066779 A1 | 5/2013 |
| WO | 2014/022909 A1 | 2/2014 |

*Primary Examiner* — Matthew D Krcha
(74) *Attorney, Agent, or Firm* — Mark T. Vogelbacker; Eckert Seamans Cherin & Mellott, LLC

(57) ABSTRACT

A closed and tamper-evident sealed container, including a fluid transport adapter. The adapter provides for sterile fluid communication between a fluid source outside the container and the container interior when adapter is open. The adapter is adjustable to a closed position wherein the fluid communication ceases. An alternative to the adapter utilizes a sampling attachment that fits into tight engagement with the lid which comprises at least one septum. Coupling the sampling attachment to the lid either causes sharps in the attachment to penetrate the at least one septum or to displace the edges of the septum inward to form a fluid communication with the container interior while the lid remains sealed closed. Other variations include a rotatable sampling attachment, a container with a displaceable bottom wall to act as a syringe and a large volume (e.g., 1500 mL) sealed ampoule which also uses a sampling attachment.

17 Claims, 29 Drawing Sheets

Related U.S. Application Data filed on Apr. 13, 2016, provisional application No. 62/334,068, filed on May 10, 2016.

(51) Int. Cl.
| | | |
|---|---|---|
| *A61J 1/14* | (2006.01) | |
| *A61J 1/20* | (2006.01) | |
| *B65D 51/00* | (2006.01) | |
| *G01N 1/14* | (2006.01) | |
| *G01N 35/10* | (2006.01) | |
| *G01N 1/10* | (2006.01) | |

(52) U.S. Cl.
CPC ........... *A61J 1/1475* (2013.01); *A61J 1/2013* (2015.05); *A61J 1/2058* (2015.05); *A61J 1/2068* (2015.05); *A61J 1/2096* (2013.01); *B65D 51/002* (2013.01); *G01N 1/14* (2013.01); *G01N 35/10* (2013.01); *A61J 1/1425* (2015.05); *G01N 2001/1056* (2013.01)

(56) References Cited

U.S. PATENT DOCUMENTS

| | | |
|---|---|---|
| 6,398,067 B1 | 6/2002 | Belfance et al. |
| 6,769,558 B1 | 8/2004 | Bucholtz |
| 7,198,161 B2 | 4/2007 | Bucholtz |
| 7,537,137 B2 | 5/2009 | Giraud |
| 8,528,778 B2 | 9/2013 | Giraud |
| 2013/0333796 A1* | 12/2013 | Py .................. B65D 51/002 141/1 |
| 2014/0238542 A1* | 8/2014 | Kvale .................. B65D 83/00 141/329 |

\* cited by examiner

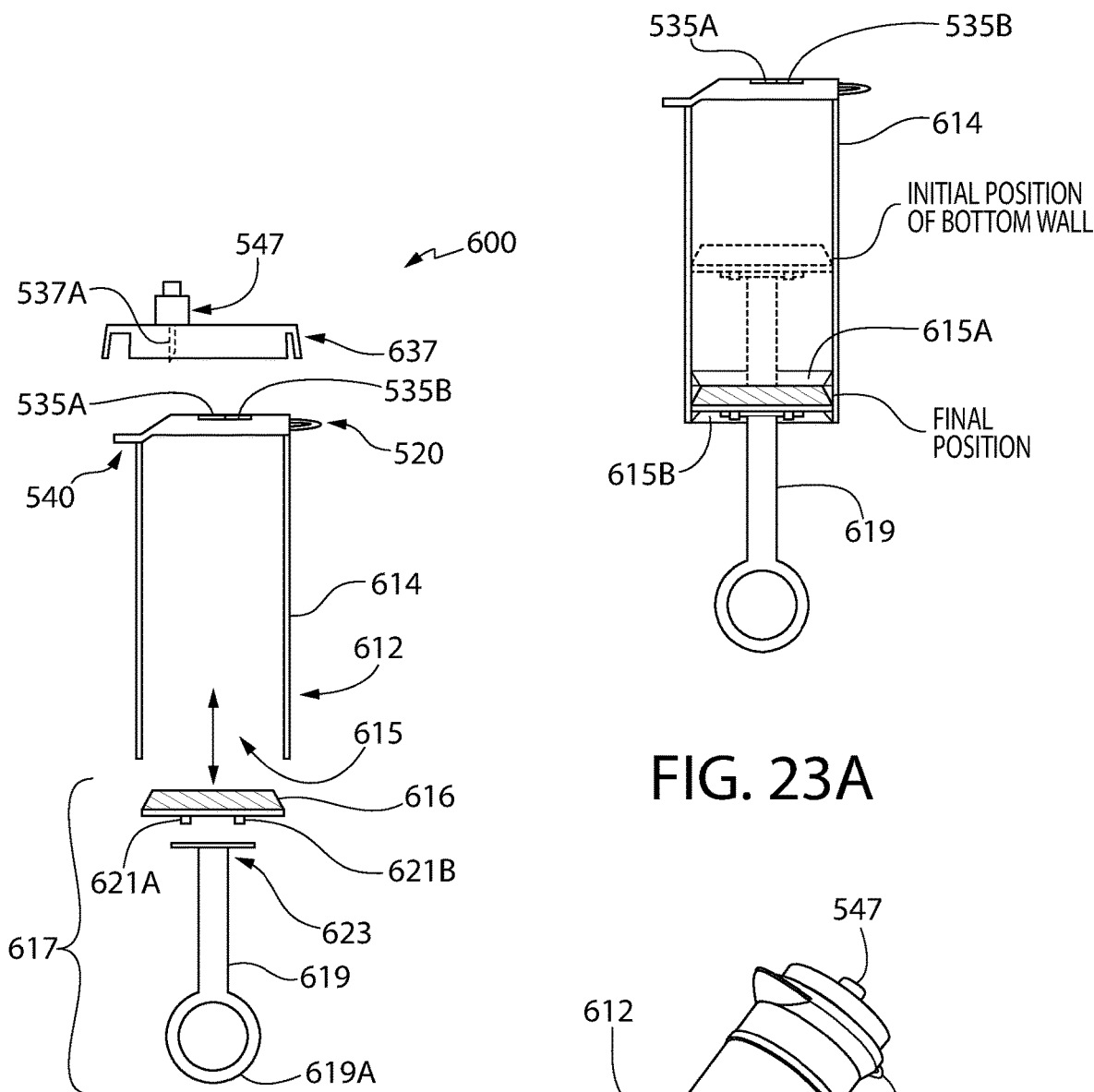
FIG. 23
FIG. 23A
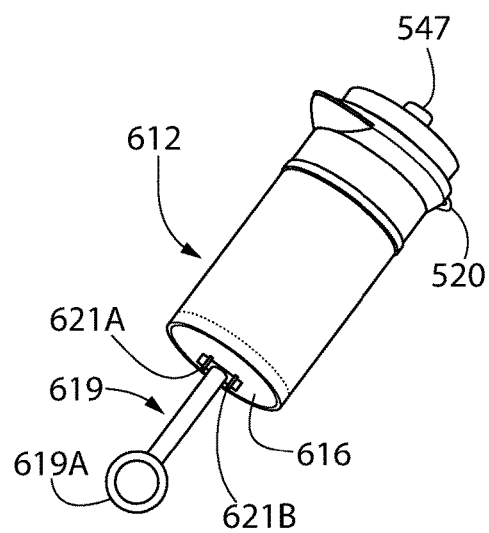
FIG. 23B

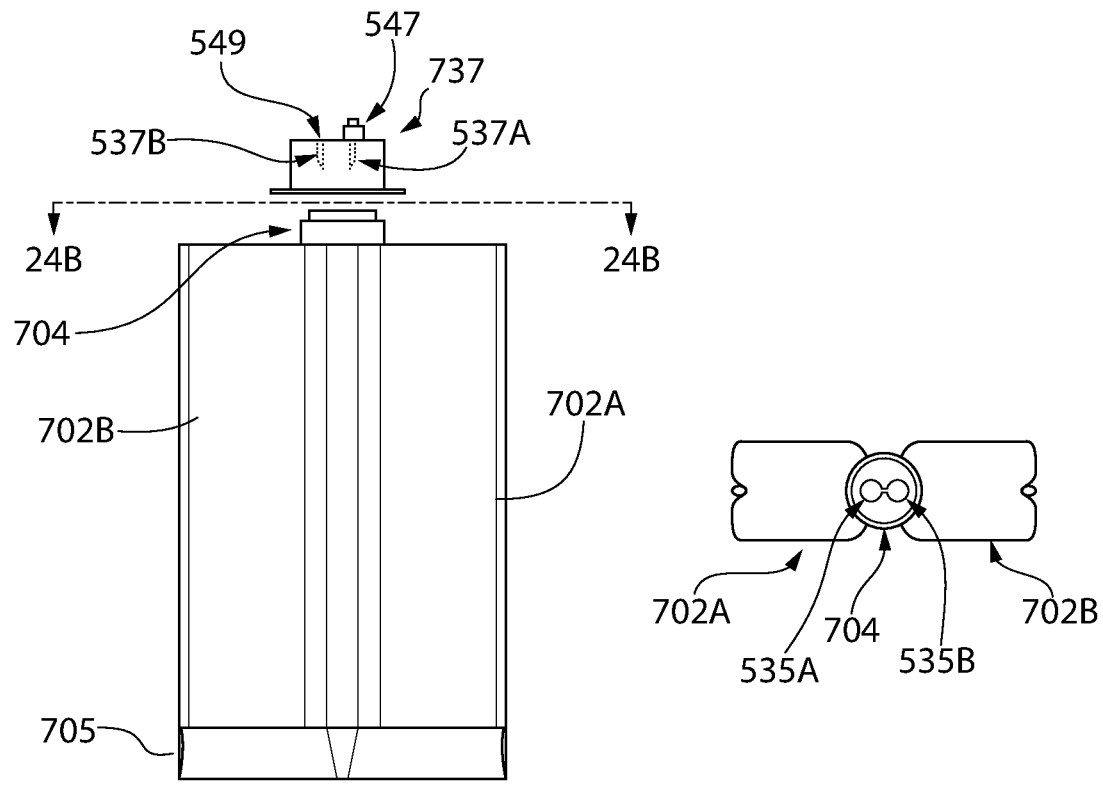
FIG. 24A
FIG. 24B
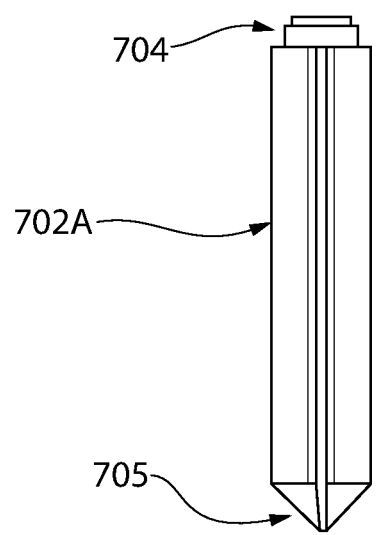
FIG. 24C

ASEPTIC TAMPER EVIDENT SAMPLING CONTAINER

CROSS-REFERENCE TO RELATED APPLICATIONS

This application is a U.S. National Phase of International Application No. PCT/US2016/036852 filed Jun. 10, 2016, which claims the benefit under 35 U.S.C. § 119(e) of Provisional Application Serial Nos. 62/174,835 filed on Jun. 12, 2015; 62/321,868 filed on Apr. 13, 2016 and 62/334,068 filed on May 10, 2016 all of which are entitled ASEPTIC TAMPER EVIDENT SAMPLING CONTAINER and all of whose entire disclosures are incorporated by reference herein.

FIELD OF INVENTION

The invention relates generally to containers adapted to receive fluid samples in a sterile manner while the containers are closed. The closed containers retain the fluid samples in sealed, tamper-evident environments until it is time to open the containers, e.g., for sample analysis.

BACKGROUND

Proper testing of biological samples, such as blood, urine and other bodily fluids, requires that such samples remain untainted from the point of extraction until the time of laboratory analysis. For some applications, it is desired to provide an openable container, such as a flip-top vial, to store biological samples. However, there are drawbacks to using known flip-top vial configurations for such purposes. For example, one conventional method of filling vials with fluid samples includes transferring portions of a bulk liquid from an opened bulk tank using a ladle. This method presents a high risk of sample contamination because it is completely open and subject to ambient conditions. In addition, the ladle itself, if not sterile, presents a contamination risk. Another option is to open a conventional flip-top vial and transfer a fluid sample contained in another package (e.g., blood tube) by, e.g., puncturing a septum in the other package with a needle connected to tubing, and allowing the sample to flow through the opening into the container. Again, this method presents the risk of contamination for reasons explained above. Moreover, with either of these methods, standard flip-top vial configurations cannot include tamper evident features when they need to be opened in order to fill them. By way of example only, other market segments such as concentrates, dairy, microbial type fluids, etc., experience similar concerns and may also provide a false positive test result due to sample contamination.

There is thus a need for a completely closed tamper evident aseptic sampling container that enables a user to fill the container with a liquid sample without opening the container or otherwise compromising the integrity of the container's tamper evident features.

SUMMARY OF THE INVENTION

Accordingly, in one aspect, there is provided an aseptic container for collecting a fluid sample therein from a fluid source. The container comprises: a lid that is sealed closed to a container body and comprises a tamper-evident mechanism at an interface between the lid and the container body; at least one septum that forms a portion of the lid; an attachment that is positioned over the lid and has a pair of lumens (e.g., sharps) that interact with the at least one septum to form a fluid passageway and a vent, respectively, to an interior of the container body; and the attachment comprises a coupling (e.g., a Luer lock) for connecting the fluid source in fluid communication with one of the lumens that form the fluid passageway to support an aseptic fluid transfer from the fluid source to the container.

A method for aseptically collecting a fluid sample within a container from a fluid source is disclosed. The method comprises: sealing a lid closed to a container body; forming a tamper-evident mechanism at an interface between the lid and the container body; forming at least one septum into a portion of the lid; interfacing a pair of lumens (e.g., sharps) into contact with the at least one septum to form a fluid passageway and a vent, respectively, to an interior of the container body; and coupling the fluid source in fluid communication with one of the pair of lumens that forms the fluid passageway to support an aseptic fluid transfer from the fluid source to the container.

In another aspect, there is provided a closed and tamper-evident sealed container comprising a fluid transport adapter thereon. The fluid transport adapter provides for sterile fluid communication between a fluid source outside the container and the inside of the container when the fluid transport adapter is open. The fluid transport adapter is adjustable to a closed position wherein the fluid communication ceases.

In a further aspect, the vial may have a built in attached arm (an embodiment of a fluid transport adapter) with luer lock adapter which may be in a closed position when oriented parallel to the outside vial wall. A user may attach either a luer lock adapter needle assembly or luer lock adapter sterile tubing, for example. The user may then rotate the arm 90 degrees counterclockwise perpendicular to the container wall. The user may then either pierce a known sampling port to allow liquid to flow into the vented container or utilize a pumping apparatus that would be attached to the container via luer lock adapted sterile tubing. The user would fill the container with the desired sample volume of liquid. After completion of attaining the desired liquid sample volume, the user may then rotate the arm assembly clockwise 90 degrees back to the closed position. This action would seal the vent and liquid orifice arm port in the container wall. The user would then remove the needle assembly from the arm or detach the medical tubing from the arm and discard needle assembly or tubing. The sample would then be ready to be sent for analysis and would not be accessible until the tamper-evident seal is removed.

Another aseptic container for collecting a fluid sample therein from a fluid source is disclosed. The container comprises: a lid that is sealed closed to a container body and comprises a tamper-evident mechanism at an interface between the lid and the container body and wherein the container body comprises a displaceable bottom wall. The displaceable wall permits the fluid sample to be drawn into an interior of the container body from the fluid source while maintaining a leak tight and sterile closed condition of the container interior during movement of the bottom wall; and at least one septum that forms a portion of the lid.

Another method for aseptically collecting a fluid sample within a container from a fluid source is disclosed. The method comprises: sealing a lid closed to a container body; forming a tamper-evident mechanism at an interface between the lid and the container body; forming at least one septum into a portion of the lid; interfacing a lumen (e.g., a sharp) into contact with the at least one septum to form a fluid passageway to an interior of the container body; coupling the fluid source in fluid communication with the lumen that forms the fluid passageway; and displacing a bottom wall of the container to draw the fluid from the fluid source into the container to support an aseptic fluid transfer from the fluid source to the container.

A further aseptic container for collecting a fluid sample therein from a fluid source is disclosed. The container comprises: a container body comprising two compartments that are in fluid communication with a central port at a first end of the container; at least one septum that forms a portion of the central port; an attachment that is positioned over the port and has a pair of lumens (e.g., sharps) that interact with the at least one septum to form a fluid passageway and a vent, respectively, to an interior of the container body; and the attachment comprises a coupling (e.g., a Luer lock) for connecting the fluid source in fluid communication with one of the lumens that form the fluid passageway to support an aseptic fluid transfer from the fluid source to the container.

A further method for aseptically collecting a fluid sample within a container from a fluid source is disclosed. The method comprises: forming a container body comprising two compartments that are in fluid communication with a central port at a first end of the container; forming at least one septum into a portion of the central port; interfacing a pair of lumens (e.g., sharps) into contact with the at least one septum to form a fluid passageway and a vent, respectively, to an interior of the container body; and coupling the fluid source in fluid communication with one of the pair of lumens that forms the fluid passageway to support an aseptic fluid transfer from the fluid source to the container.

BRIEF DESCRIPTION OF THE DRAWINGS

The invention will now be described in conjunction with the following drawings in which like reference numerals designate like elements and wherein:

FIG. 23 is exploded view of a seventh embodiment which utilizes a displaceable bottom wall for the vial or container to operate as a syringe;

FIG. 23A is a side view of the seventh embodiment showing an exemplary bottom wall lock with the bottom wall locked therein;

FIG. 23B is an isometric view of the seventh embodiment;

FIG. 24A is an exploded side view of the eighth embodiment;

FIG. 24B is a top view of the eighth embodiment omitting the sampling attachment; and FIG. 24C is a side view of the eighth embodiment omitting the sampling attachment;

DETAILED DESCRIPTION OF THE PREFERRED EMBODIMENTS

Figure 1A:
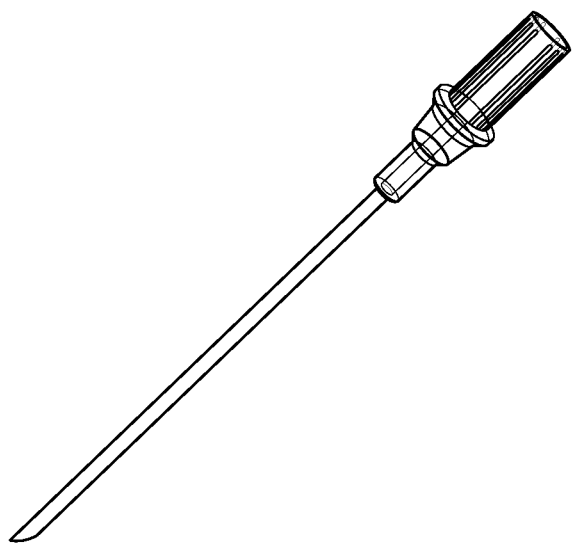
FIG. 1A depicts an exemplary prior art needle assembly that couples to the present aseptic tamper-evident sampling vial for providing the sample fluid.

By way of background, two preferred features of some embodiments according to the present invention are (1) tamper-evident features; and (2) flip-top vials that are closed in the mold during manufacture. A brief description of each of the two aforementioned features is now provided.

U.S. Pat. No. 6,398,067, which is incorporated by reference herein in its entirety, describes tamper-proof container seals. For some applications, it may be desirable to have a container and cap assembly that provides a tamper-proof seal. For example, during forensic and laboratory applications such as drug and alcohol testing, uses of such containers desire a tamper-evident seal to establish the integrity of the specimens. Another example involves microbial-based solutions which can also provide a false negative test result if contaminated; thus, a tamper-evident feature ensures the lab technician recipient that the sample has not been opened, thus providing a more accurate sample. Consequently the so-called "chain of custody" of the contents of the container is visually maintained. Various embodiments of tamper-evident features are disclosed in U.S. Pat. No. 6,398,067 and may (among other variations) be incorporated into aspects of the present invention. The primary purpose of a tamper-proof (more accurately, "tamper-evident") feature is that it provides evidence as to whether or not a container has been opened. This is typically achieved by providing a breakable structure securing the lid to the container body. If the breakable structure is broken or has its structural integrity otherwise compromised, that serves as evidence that the container has been tampered with.

U.S. Pat. No. RE37,676, which is incorporated by reference herein in its entirety, describes molding apparatus and methods for achieving leak proof flip-top vials. In brief, that patent describes how during the molding of flip-top vials, the molding material is cooled and the cap is closed while still in the mold, before the molding material is fully set. The sealing of the cap to the vial while the plastic is not yet set allows the cap and vial to conform to each other and to form the desired leak proof seal. Moreover, this technique enables production of an aseptic vial since the interior of the vial is still hot when the vial is closed and closing of the vial is done through an automated process (rather than manually with human hands). Aspects of U.S. Pat. No. RE37,676 are incorporated into the present invention.

Containers according to the present invention are preferably resealable and leakproof, and more preferably moisture-tight. U.S. Pat. Nos. 6,769,558 and 7,198,161, which are incorporated by reference herein for their resealable/leakproof/moisture-tight aspects, disclose a leakproof, resealable, flip-top cylindrical container and cap assembly which comprises a cap and container attached by a hinge. A user is readily able to close the lid using the front tab on the lid. Those patents are incorporated herein by reference in their entireties for the characteristics and dimensions of a suitable seal for a container and cap assembly. When forming a moisture-tight seal using the flip-top closure described in the foregoing patents, the closure exerts a compressive force about the top of the container body. A sealing relationship is formed between the closure and the container body. Alternative sealing mechanisms, such as the lip seal disclosed in U.S. Pat. Nos. 7,537,137 and 8,528,778, which are incorporated by reference herein in their entireties, may be used to provide a leakproof and preferably moisture-tight seal, optionally for containers according to the present invention.

As used herein, the term "resealable" means that the lid of the container can be opened/reopened and closed/reclosed a numerous amount of times (e.g. more than 10 times) and still retain its leakproof or preferably moisture-tight properties.

As used herein, the term "vial" which is a type of container may sometimes be used interchangeably with the word "container."

As used herein, the term "moisture-tight" means the moisture ingress of the container (after three days) was less than about 1500 micrograms of water, in another embodiment, about 500 micrograms of water, in a further embodiment, about 300 micrograms of water, in yet another embodiment, about 150 micrograms of water determined by the following test method: (a) place one gram plus or minus 0.25 grams of molecular sieve in the container and record the weight; (b) fully close the container; (c) place the closed container in an environmental chamber at conditions of 80% relative humidity and 72 F.; (c) after one day, weigh the container containing the molecular sieve; (d) after four days, weigh the container containing the molecular sieve; and (e) subtract the first day sample from the fourth day sample to calculate the moisture ingress of the container in units of micrograms of water.

As used herein, the term "leakproof" means that the container passes the blue crystal dye test. The blue crystal dye test is a visual test to detect leaks within a container seal. A container "passes" the blue crystal dye test if the white paper, in which the container is placed on, does not visually change color (i.e. the white paper does not become contaminated with the blue crystal dye liquid from the container). The blue crystal dye test procedure includes the following: (a) the blue crystal dye liquid is prepared by adding one teaspoon of blue crystal dye powder to one gallon of alcohol and the thoroughly mixing the solution; (b) the blue crystal dye liquid is poured into the container (i.e. a sufficient amount of the dye liquid must be added so, when the container is placed upside down, the entire seal area must be covered); (c) the container is closed by applying, in a singular motion, a frontal downward pressure upon the thumb tab (e.g. a user places his/her thumb parallel or on top of the thumb tab and applies a singular downward pressure) until the rim portion, adjacent to the thumb tab, contacts the inside flat part of the cap; (d) the container is placed upside down (i.e. inverted) on the white paper at room temperature; and (e) after 30 minutes, the white paper is inspected to determine if the white paper is contaminated with the blue crystal dye liquid.

While the present invention is not limited to flip-top vials, the disclosed embodiments are flip-top vials. The various embodiments of the flip-top vials disclosed herein include distinguishing features. However, they also include certain generally common features ("common" as in the presence of such features, although they may differ in their details). These common features are now described simultaneously with reference to the several flip-top vial embodiments described herein. As may be the case, some of these common features may be described with reference to fewer than all figures depicting flip-top vials, e.g., where such common features are more readily visible in some figures than others. A description of distinguishing features of each of these embodiments will then follow.

Referring now in detail to the various figures of the drawings wherein like reference numerals refer to like parts, there is shown in FIGS. 2-18 flip-top aseptic sampling vials 10, 100, 200, 300, 400, 500 according to optional embodiments of the present invention. The vials 10, 100, 200, 300, 400, 500 may each respectively include a body 12, 112, 212, 312, 412, 512, an interior space 224, 324, 524 a body sealing surface 228, 328, 528, a lid 18, 118, 218, 318, 418, 518 and a lid sealing surface 234, 334, 534.

The body 12, 112, 212, 312, 412, 512 has a generally tubular sidewall 14, 114, 214, 314, 414, 512 with a base 16, 116, 216, 316, 416, 516 axially spaced from the opening 226, 326. The body 12, 112, 212, 312, 412, 512 as shown in the figures is generally round, however other cross-sectional shapes are contemplated as well, e.g., elliptical.

It should be noted that FIGS. 4-18 show transparent vial components (e.g., lids 18/118, container bodies 12/112, shields S, etc.) by way of example only. These components do not necessarily have to be transparent and could be opaque or a mixture of both.

An integral hinge 20, 120, 220, 320, 420, 520 may link the body 12, 112, 212, 312, 412, 512 and the lid 18, 118, 218, 318, 418, 518. The hinge 20, 120, 220, 320, 420, 512 can be configured to orient the lid 18, 118, 218, 318, 418, 518 to seat on the body 12, 112, 212, 312, 412, 512 when the lid 18, 118, 218, 318, 418, 518 and body 12, 112, 212, 312, 412, 512 are pivoted together. The lid 18, 118, 218, 318, 418, 518 comprises a base 232, 332, 532, a skirt 236, 336, 536 extending from the base 232, 332, 532 and optionally a thumb tab 122 to facilitate a user's opening of the vial 10, 100, 200, 300, 400 once the structural integrity of a tamper-evident feature (discussed below) is irreversibly compromised. The lid sealing surface 234, 334 may be positioned around the periphery of the interior of the base 232, 332 of the lid 18, 118, 218, 318, 418, adjacent to the skirt 236, 336. When the lid 18, 118, 218, 318, 418 is seated on the body 12, 112, 212, 312, 412, the body sealing surface 228, 328 and lid sealing surface 234, 334 may be configured to mate to form a leakproof or preferably moisture tight seal, isolating the interior space 224, 324 from ambient conditions. Shield elements S (FIGS. 4-7) protrude from the lower portion of the vial 14 and 114 and in between which the distal end of the arm is positioned when the fluid transport adapters 50 and 150 are in the closed position. These shield elements S, among other things, prevent inadvertent contact with the distal end of the arm that may stress and/or damage the hinge points 52 and 152.

Figure 10:
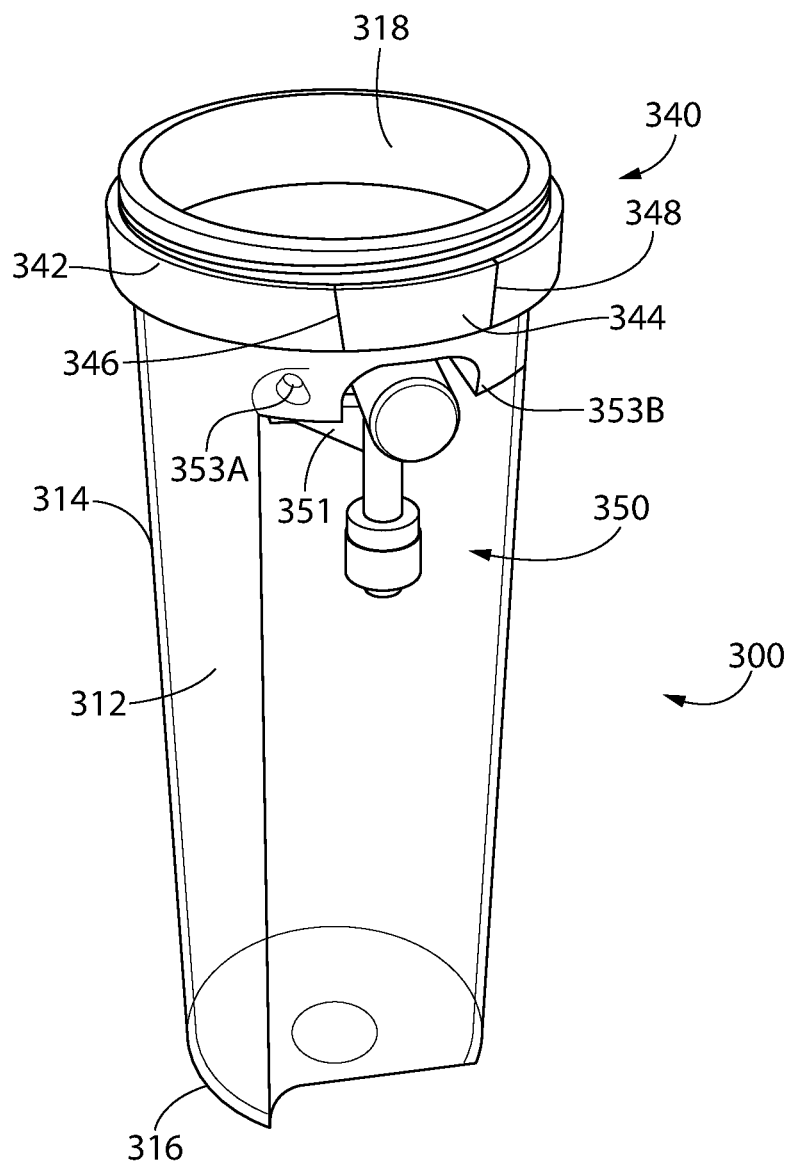
FIG. 10 shows a perspective view of a fourth embodiment of an aseptic tamper-evident sampling vial according to an aspect of the invention.
Figure 11:
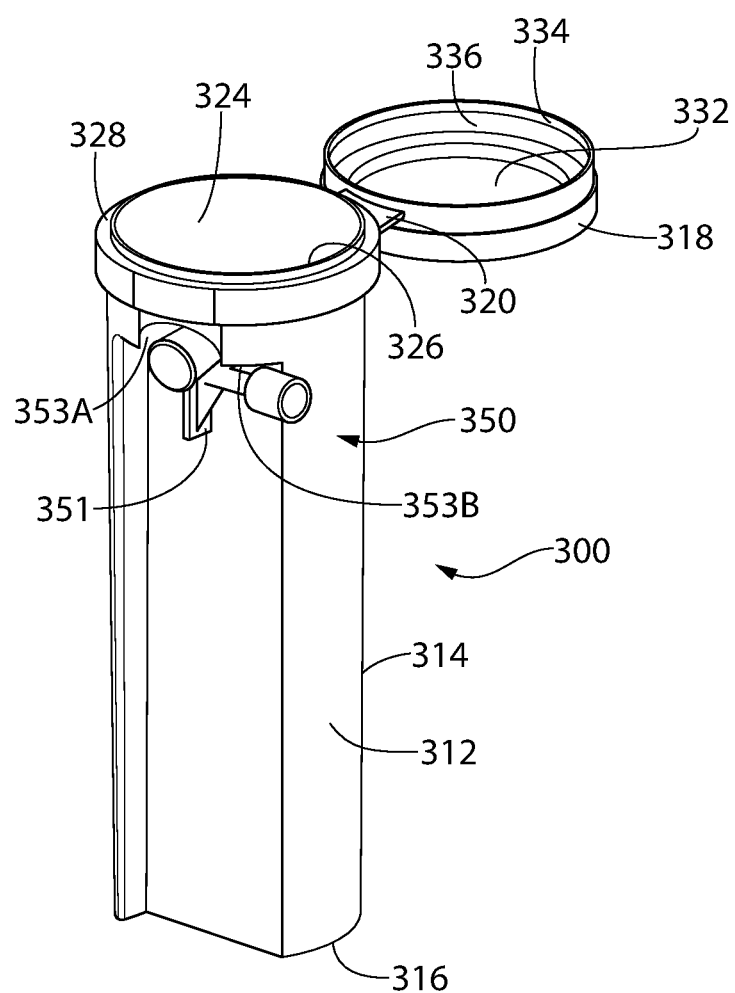
FIG. 11 shows a perspective view of the vial of FIG. 7 in an opened position.
Figure 12:
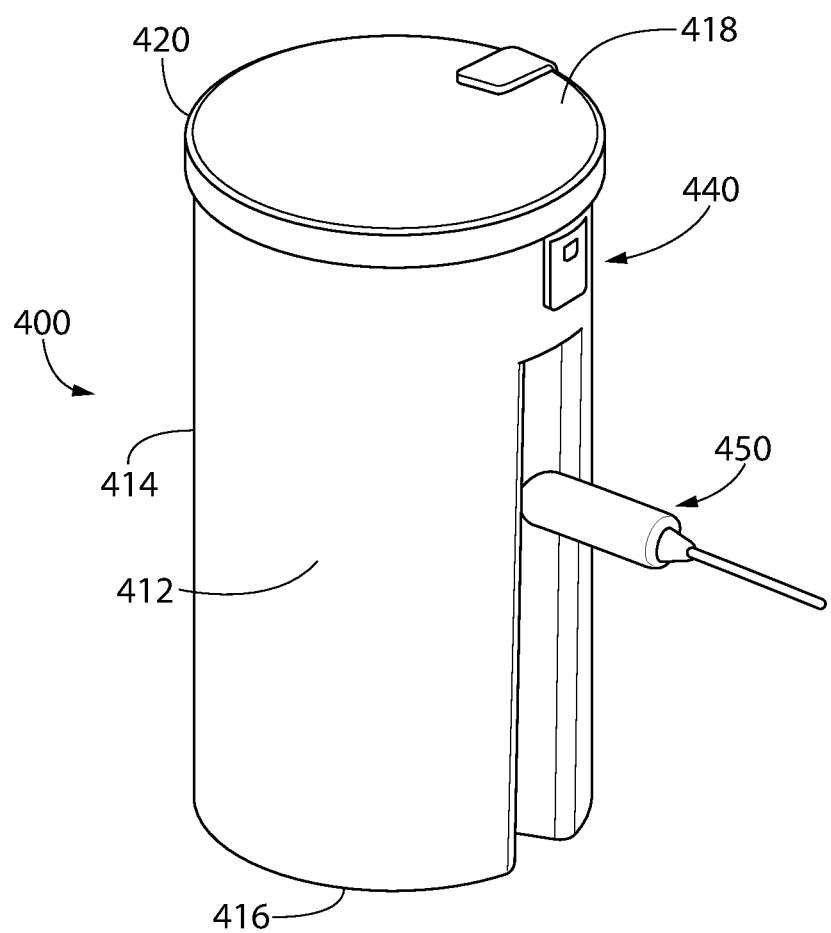
FIG. 12 shows a perspective view of a fifth embodiment of an aseptic tamper-evident sampling vial according to an aspect of the invention.

Optionally, the vials 10, 100, 200, 300, 400, 500 may be molded by closing the cap in the mold, e.g., as taught in U.S. Pat. No. RE37,676. In so doing, a seal, which is at least leakproof, is established. In addition, this process provides an aseptic container, as explained above. It is further preferred that vials according to the present invention include tamper-evident features. The vials 10, 100, 200, 300, 400, 500 illustrate some exemplary tamper-evident mechanisms. The vials 10, 400, 500 shown in FIGS. 4, 12 and 13 respectively, for example, have tamper-evident mechanisms 40, 440, 540 that are at least substantially similar in structure and function to that described in U.S. Pat. No. RE37,676. The vial 300 in FIG. 10 illustrates an alternative tamper-evident mechanism 340. The mechanism 340 includes a ring 342 that is wrapped around an upper section of the vial 300. The ring 342 covers a portion of the lid 318 around the lid's periphery and an upper section of the body 312. The ring 342, when intact, helps to secure the lid 318 to the body 312, e.g., by limiting a user's access to the lid 318. In other words, the lid 318 is not openable unless the ring 342 is removed. The ring 342 includes a breakable section 344 connected in a frangible manner to the ring 342 at two ends 346, 348 thereof. When it is time to open the vial 300, a user may pry off the breakable section 344, thus providing access to an optional thumb tab with which to open the lid 318. An irreversibly breakable tamper-evident mechanism such as the mechanism 340 shown in FIG. 10 provides assurance, when intact, that vial contents have not been tampered with. On the other hand, interruptions in the structural integrity of the mechanism 340 would indicate to a user that contents of a vial have been compromised.

The above description provides exemplary embodiments of aseptic leak proof or moisture tight and tamper-proof vials. The present invention further contemplates ways in which fluid specimens may be transferred into the vials without opening them or compromising the structural integrity of their respective tamper-evident mechanisms. In other words, the present invention includes features that facilitate the sterile transfer of fluids into unopened vials which have been closed and sealed since the point of manufacture. These features may be implemented in a variety of ways, some of which are described with reference to the vials 10, 100, 200, 300, 400, 500 described herein.

Optionally, the present invention may include a completely closed tamper-evident aseptic sampling container that provides a user with a build-in retrieval mechanism, e.g., via needle assembly or tubing adaptation to retrieve a desired sample volume for lab analysis. A container according to an aspect of the present invention may provide accurate sample representation that is free from contamination that would be due to an open environment. As explained above, an open environment can pose micro-contamination risks, which may result in a laboratory sampling error. Various embodiments of fluid transport adapters 50, 150, 250 (FIG. 8, with a displaceable shield S1 which serves similar purposes described above with regard to shield elements S), 350, 450 are shown in the illustrative drawing figures.

Figure 1B:
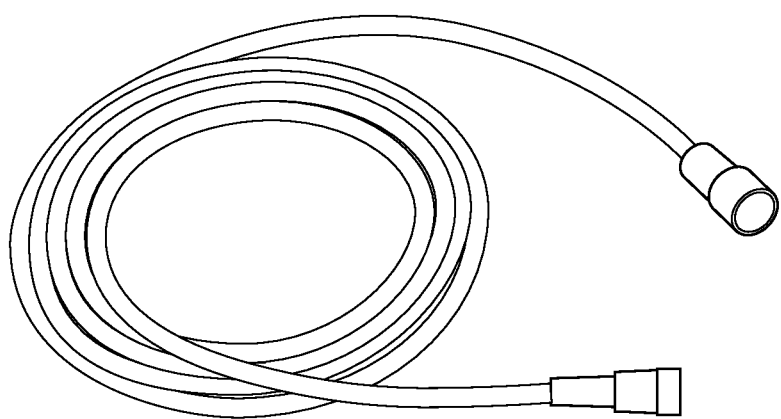
FIG. 1B depicts an exemplary prior art tubing assembly that couples to the aseptic tamper-evident sampling vial for providing the sample fluid.
Figure 2:
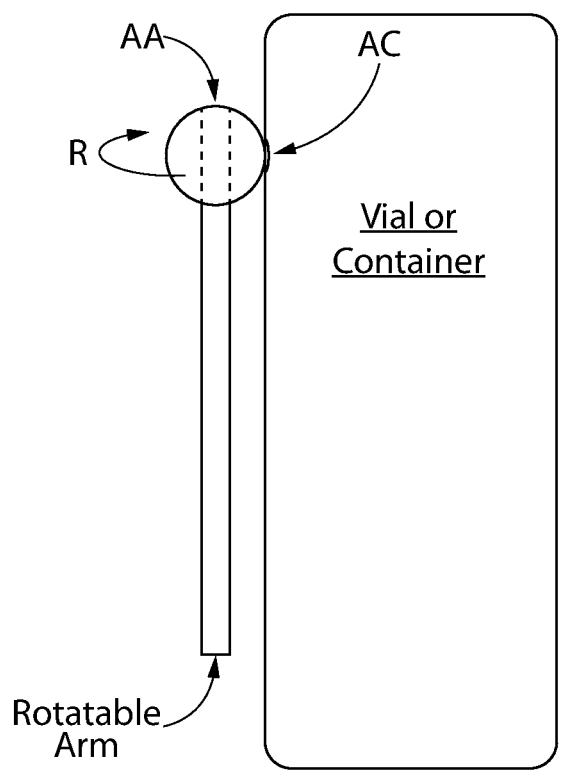
FIG. 2 is a functional diagram of the aseptic tamper-evident sampling vial that utilizes a rotatable arm.

In several of the following embodiments, the vial may comprise a built-in attached arm with luer lock adapter which may be in a closed position when oriented parallel to the outside vial wall and in an open position when oriented perpendicular to the outside vial wall (FIG. 2). A user may attach either a luer lock adapter needle assembly (FIG. 1A) or luer lock adapter sterile tubing (FIG. 1B), for example. The user may then rotate the arm 90 degrees counterclockwise perpendicular to the vial wall as indicated by the arrow R; as can be seen from FIG. 2, rotation of the arm in the 90 degrees counterclockwise position, aligns the arm aperture AA with the container wall aperture AC to enable fluid transfer into the vial. The user may then either pierce a known sampling port to allow liquid to flow into the vented vial or utilize a pumping apparatus (e.g., a peristaltic pump) that would be attached to the container via luer lock adapted sterile tubing. The user would fill the container with the desired sample volume of liquid. After attaining a desired liquid sample volume, the user may then rotate the arm assembly clockwise 90 degrees back to the closed position, which mis-aligns the apertures AA and AC, thereby closing off aperture AC (FIG. 2). This action would seal the vent and liquid orifice arm port in the container wall (viz., the thermoplastic elastomer material in the arm assembly creates a seal when the arm is closed). The user would then remove the needle assembly from the arm or detach the medical tubing from the arm and discard needle assembly or tubing. The sample would then be ready to be sent for analysis and would not be accessible until the tamper-evident seal is removed.

Figures 3A, 3B:
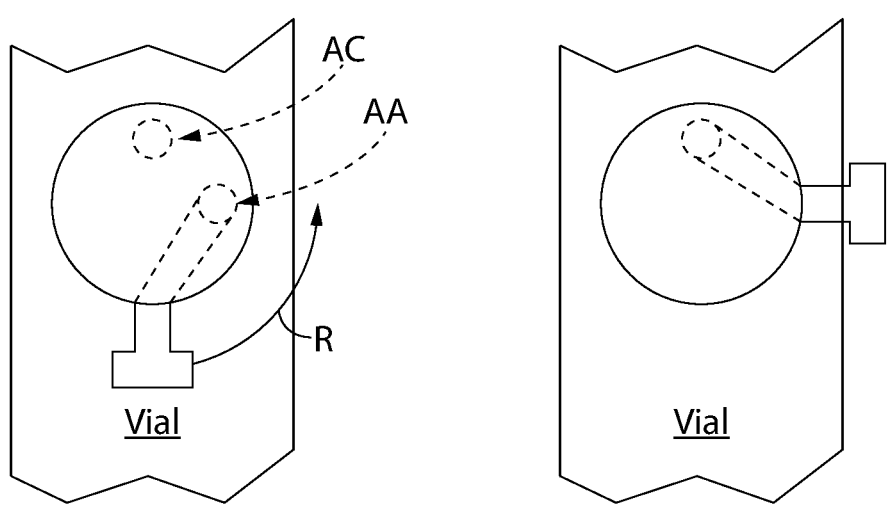
FIG. 3A is a functional diagram of the aseptic tamper-evident sampling vial (shown partially) that utilizes a different rotatable arm in a closed position.
FIG. 3B is a functional diagram of the aseptic tamper-evident sampling vial (shown partially) of FIG. 3A showing the rotatable arm in an open position.
Figure 4:
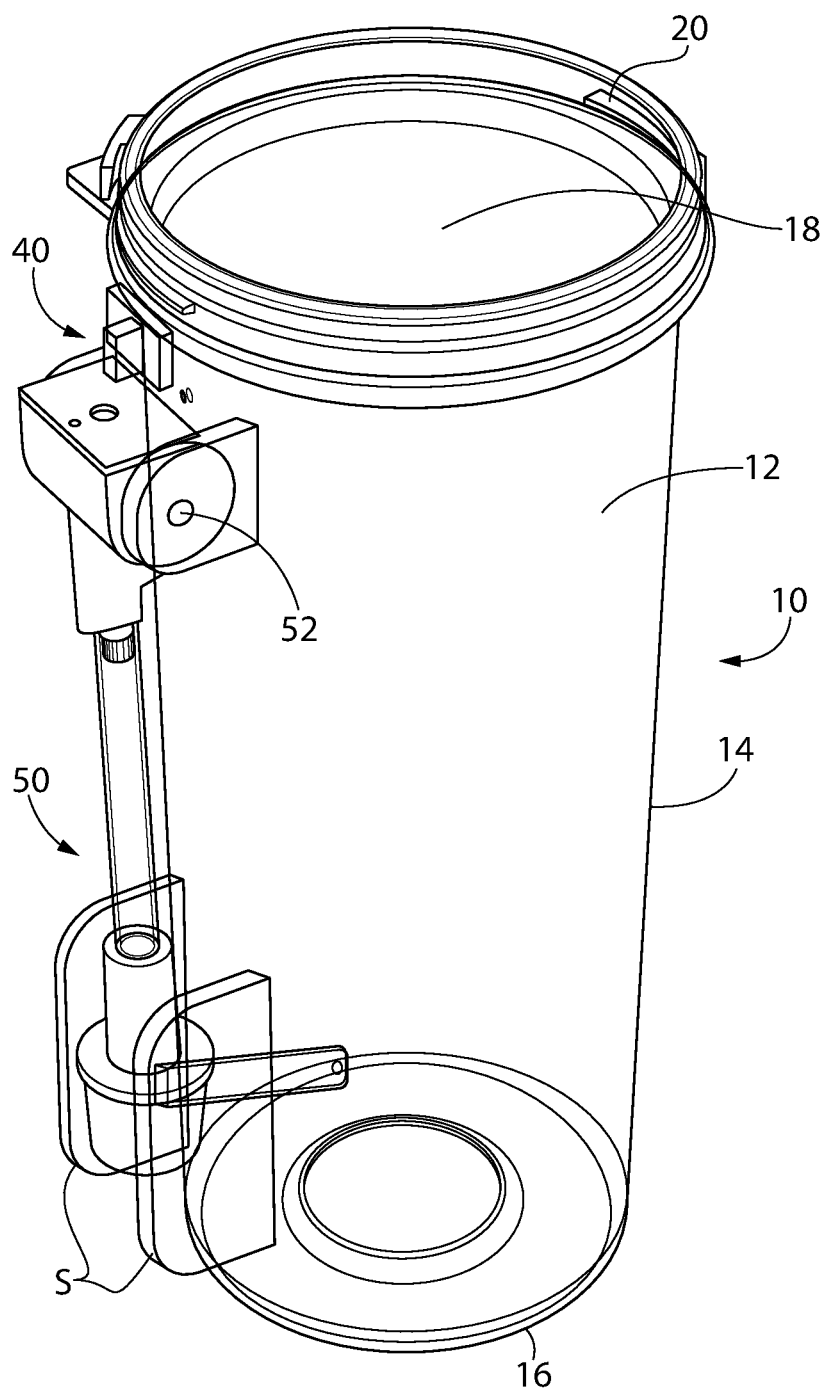
FIG. 4 shows a perspective view of a first embodiment of an aseptic tamper-evident sampling vial according to an aspect of the invention.
Figure 5:
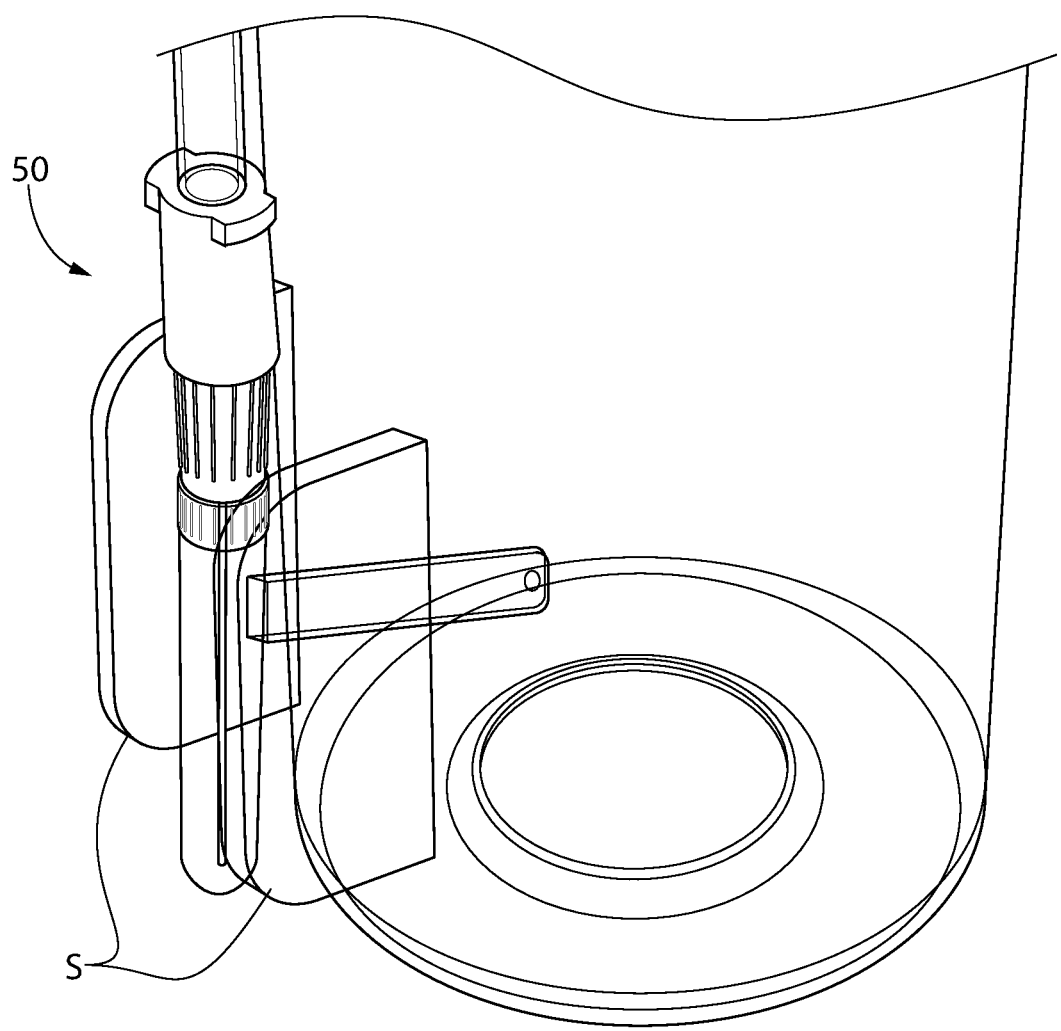
FIG. 5 shows an enlarged view of a bottom section of the vial of FIG. 4.
Figure 6:
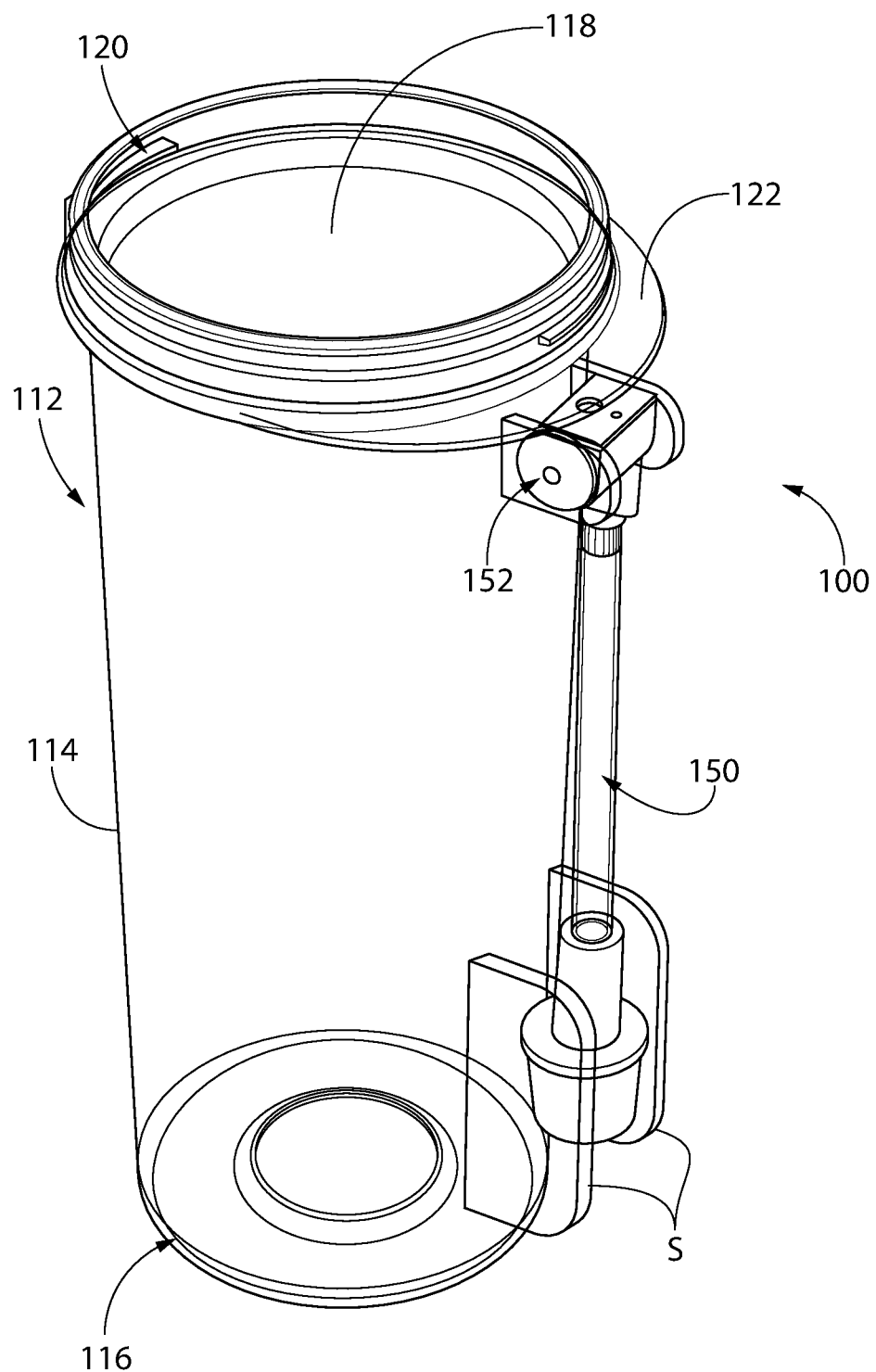
FIG. 6 shows a perspective view of a second embodiment of an aseptic tamper-evident sampling vial according to an aspect of the invention.
Figure 7:
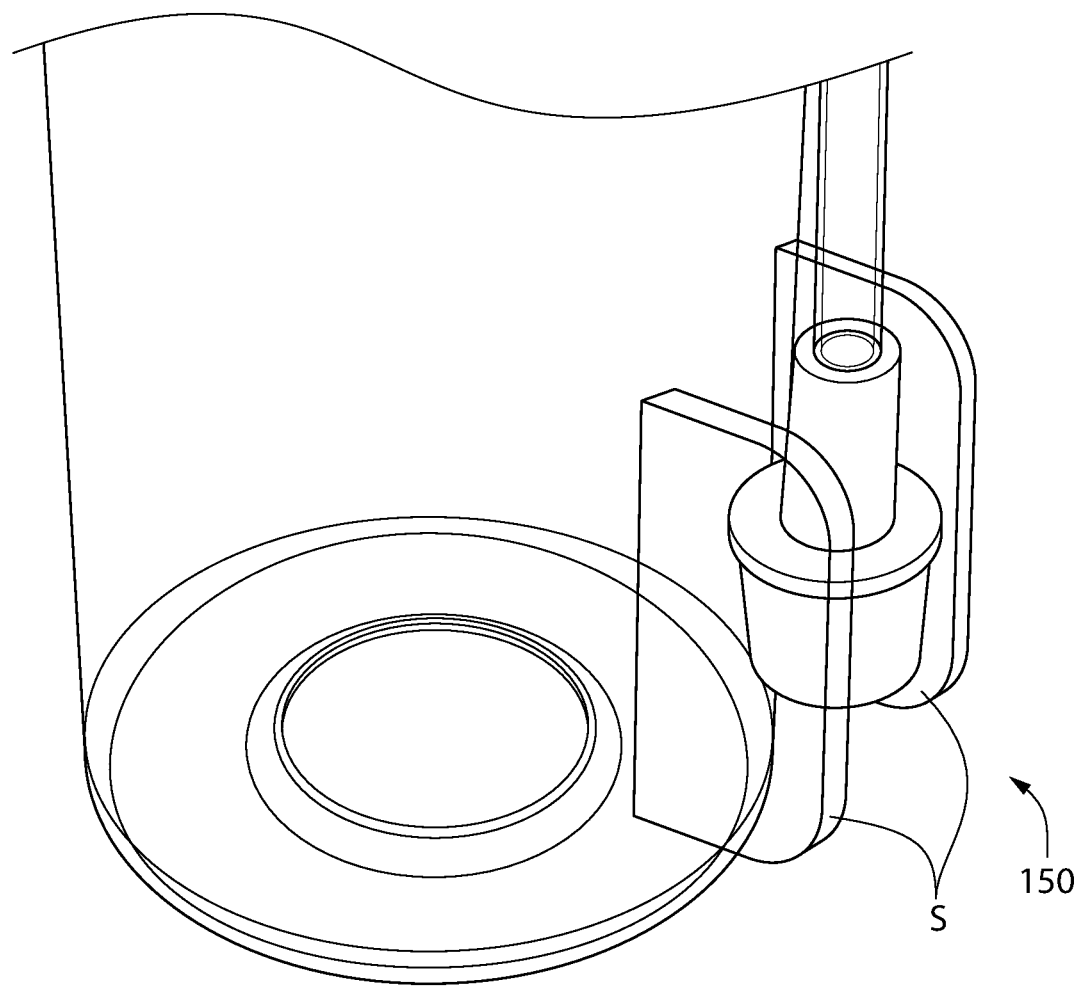
FIG. 7 shows an enlarged view of a bottom section of the vial of FIG. 6.
Figure 8:
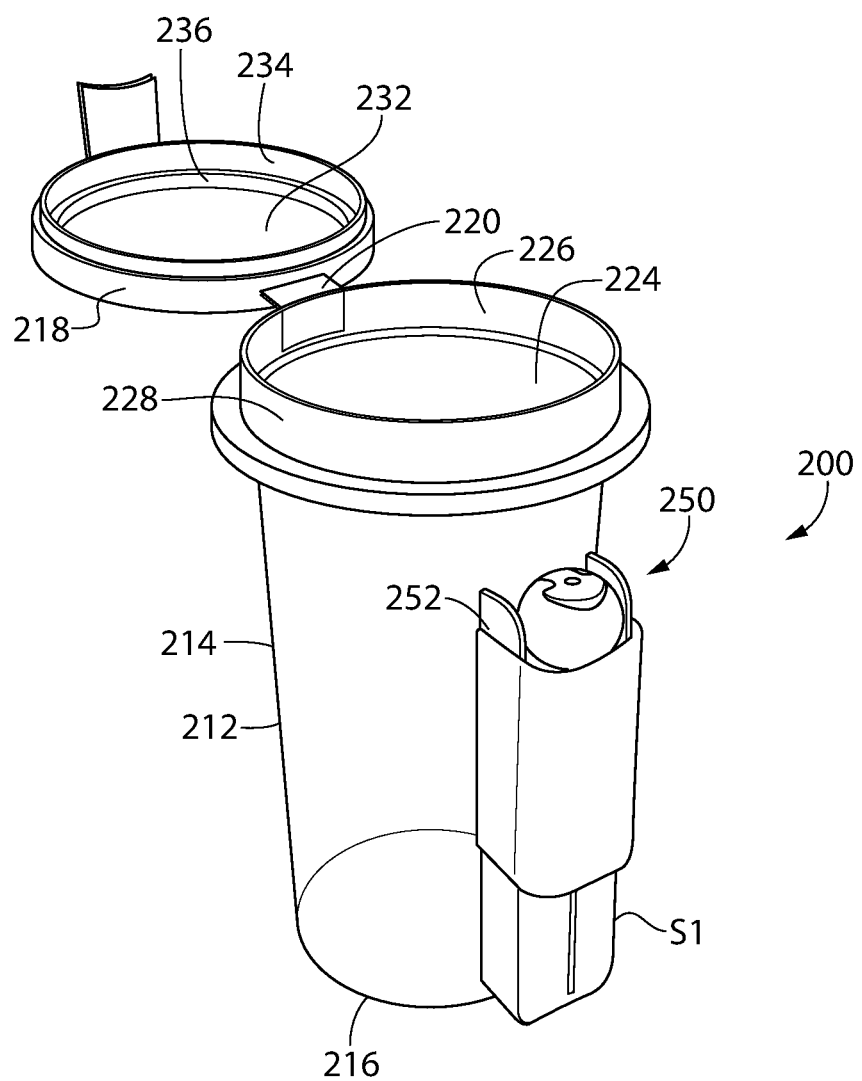
FIG. 8 shows a perspective view of a third embodiment of an aseptic tamper-evident sampling vial according to an aspect of the invention.
Figure 9:
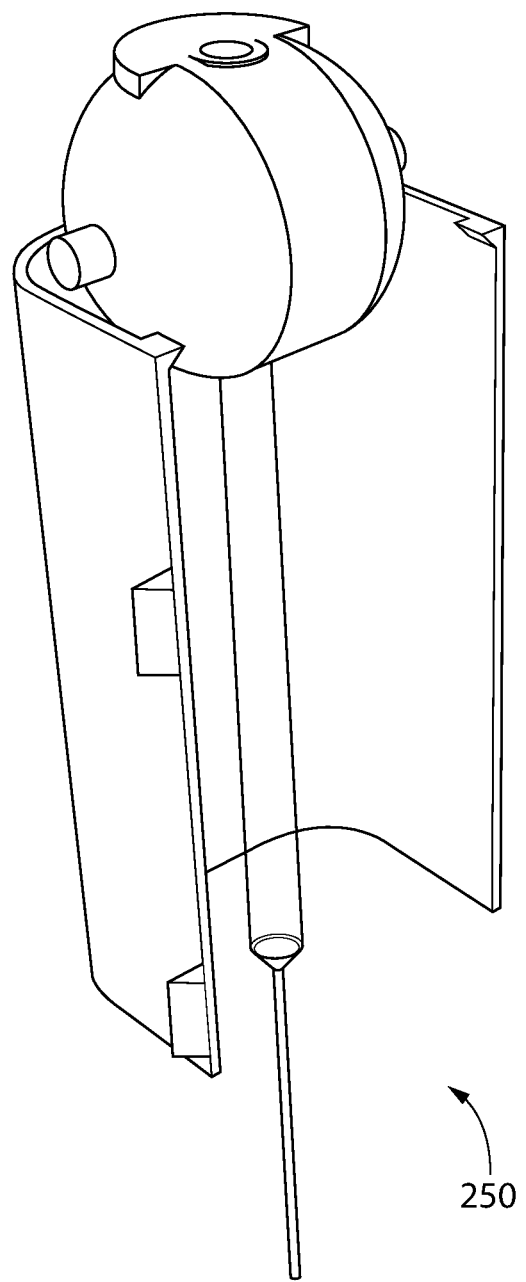
FIG. 9 shows an isolated perspective view of a fluid transport adapter for use with the vial of FIG. 8.

In another embodiment, the built-in attached arm with luer lock adapter rotates in a plane parallel to the container wall. In particular, as shown in FIGS. 3A-3B, the built-in attached arm comprises an aperture AA that is 90 degrees displaced from the vial or container aperture AC (FIG. 3A); in this closed position, the thermoplastic elastomer material in the built-in attached arm creates a seal. When the arm is rotated in the direction of arrow R, as shown in FIG. 3B, the two apertures AA and AC are aligned, thereby enabling fluid transfer into the vial.

Thus, in one aspect, the fluid transport adapters 50, 150, 250, 350, 450 may be adapted to rotate, e.g., 90 degrees, from a sealed position (e.g. parallel with the sidewall 14, 114, 214, 314, 414 of a given vial 10, 100, 200, 300, 400) to an open or flow position (e.g., 90 degrees relative to the sidewall 14, 114, 214, 314, 414 of a given vial 10, 100, 200, 300, 400). Optionally, the fluid transport adapters 50, 150, 250, 350, 450 are rotatable about hinge joints 52, 152, 252. Each respective fluid transport adapter 50, 150, 250, 350, 450 provides for sterile fluid communication between a fluid source outside the vial and the inside of the vial when the fluid transport adapter 50, 150, 250, 350, 450 is in an open or flow position. The fluid transport adapter 50, 150, 250, 350, 450 is adjustable from the open or flow position to a closed position wherein the fluid communication ceases.

FIG. 10, for example, shows a fluid transport adapter 350 in a closed position, oriented parallel to the vial 300. The adapter 350 is rotatable to an open or flow position, which is optionally oriented 90 degrees from the closed position. When the adapter 350 is in the closed position, fluid communication between the ambient environment and the interior space 324 in the vial 300 ceases. A user may attach either a luer lock adapter needle assembly or luer lock adapter sterile tubing (depending on the structure of the fluid transport adapter, e.g., 350) to transport a fluid sample, in a sterile manner, from a fluid source into the vial 300. This transfer is only possible, however, when the adapter 350 is in open or flow position. The adapter 350 further comprises a stop member 351 that engages stop surfaces 353A and 353B depending on the closed or open position, respectively, of the adapter 350.

Optionally, the fluid transport adapter provides only for unidirectional flow, i.e., from outside the vial to inside the vial.

Optionally, there is a hinged door on the side of the vial.

Optionally, the fluid transport adapter is contained within the outer vial diameter, which may enable the vial to be utilized in automated laboratories.

Optionally, once a fluid transport adapter is moved from an open or flow position to a closed position, the adapter is immovably locked in that position to ensure that the specimen in the vial will not be subsequently tampered with or otherwise tainted (e.g., by adding additional substances into the vial through the fluid transport adapter at a later time or otherwise opening up the vial to contamination). Alternatively, a tamper proof mechanism such as an irremovable door may be secured to block access to the transport adapter and/or to prevent moving the adapter again into an open position once the vial has been filled.

FIGS. 13-18 depict a sixth embodiment of an aseptic tamper-evident sampling vial 500 that is adapted for an automated aseptic fluid sampling transfer. As such, a plurality of these vials 500 can be positioned in an array (e.g., a rack or tray, not shown) and respective fluid sampling transfers can be deposited within respective vials 500 without the need for opening each vial nor the need to activate fluid transport adapters/arm for each vial, as discussed previously.

Figure 13:
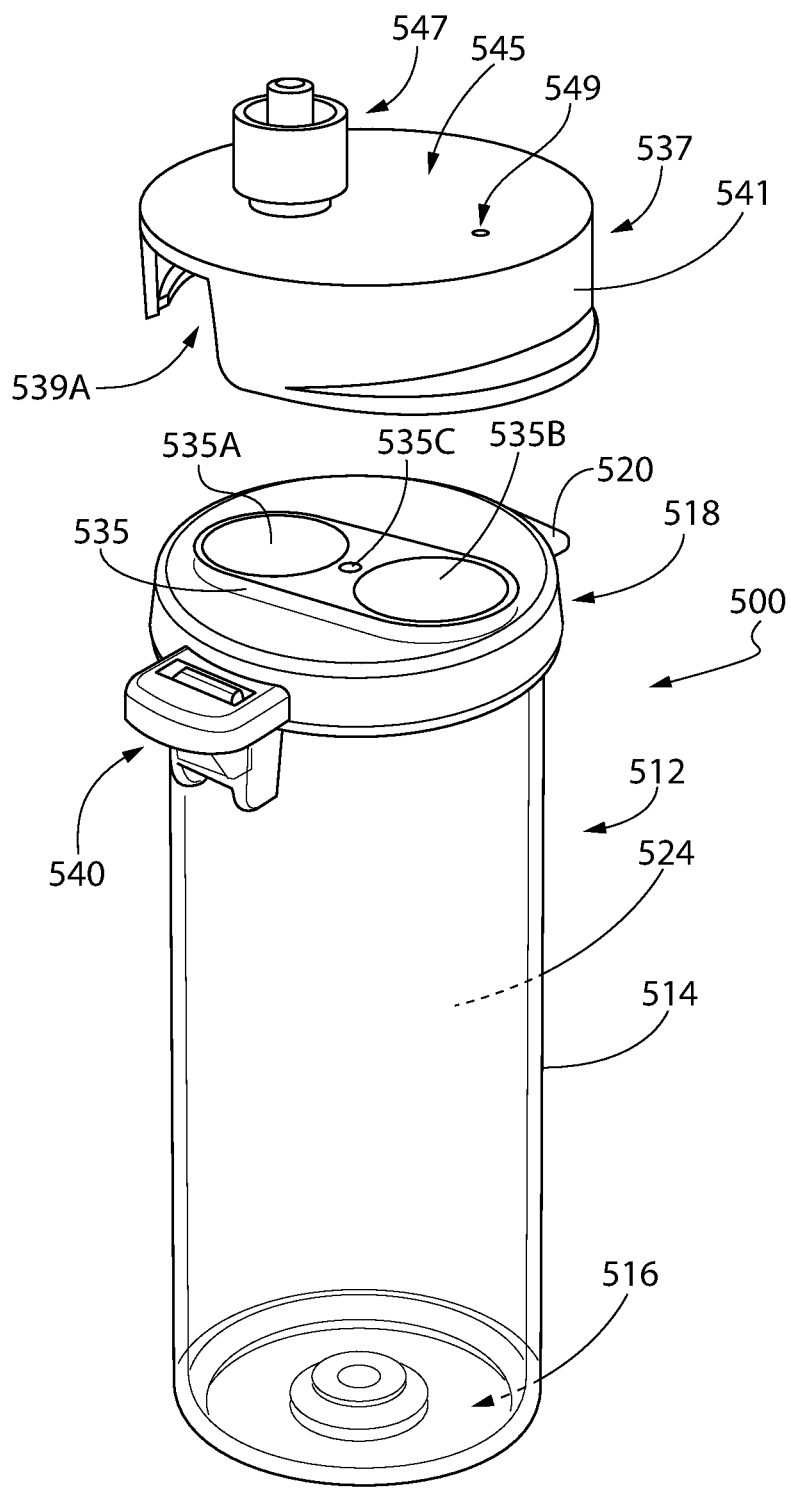
FIG. 13 is an exploded isometric view of a sixth embodiment of an aseptic tamper-evident sampling vial according to an aspect of the invention.
Figure 14:
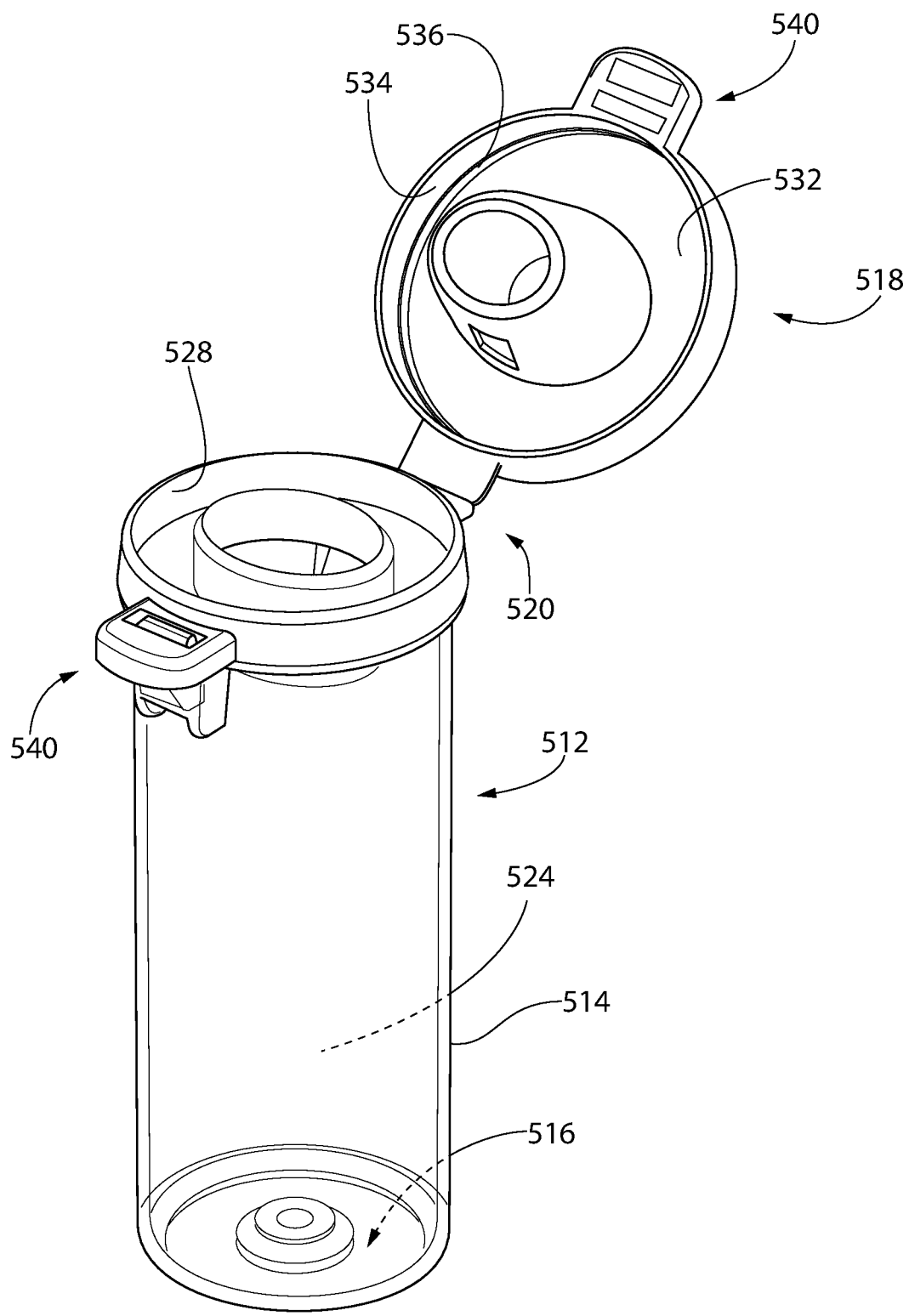
FIG. 14 is an isometric view of the sixth embodiment showing the container's lid opened and with the sampling attachment omitted.

In particular, as shown most clearly in FIG. 13, the vial 500 (e.g., 2 ounce volume) comprises a body configuration, viz., a body 512 formed of a tubular sidewall 514 and base 516 forming an interior space 524, similar to the vial body configurations discussed previously with regard to the earlier-discussed embodiments and thus will not be repeated here. The vial 500 comprises a lid 518 that is pivotably coupled to the body 512 via an integral hinge 520 and wherein the lid 518 also comprises an exemplary tamper-evident mechanism 540 (discussed below) diametrically-opposed to the integral hinge 520, as also discussed previously with regard to the earlier embodiments. Furthermore, as shown in FIG. 14, the top of the tubular sidewall 514 comprises a body sealing surface 528 that cooperates with a lid sealing surface 534 to form a leakproof seal when the lid 518 is closed on top of the body 512, as also was discussed with regard to the previous embodiments.

Figure 15:
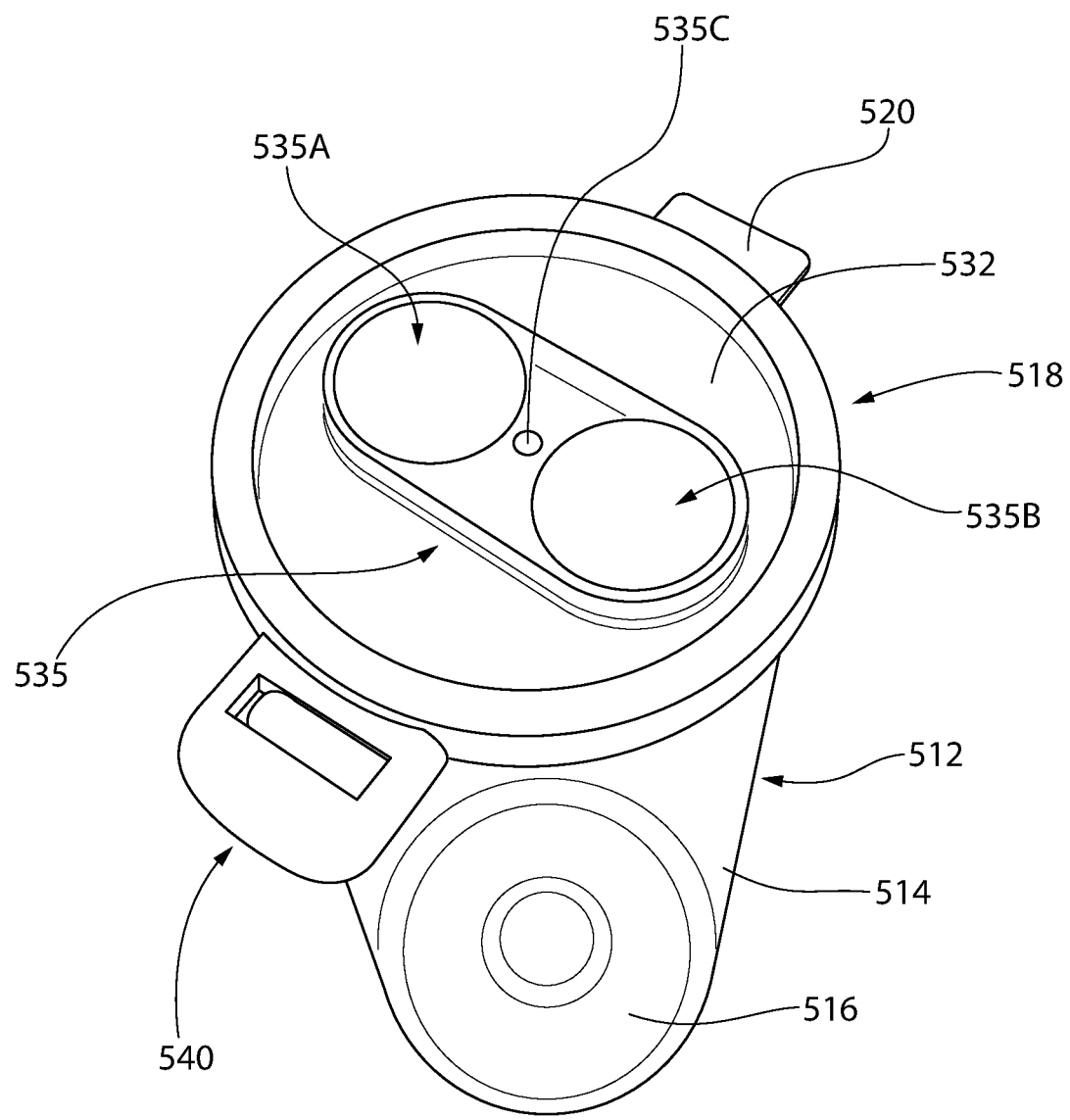
FIG. 15 is a top view of the sixth embodiment showing the container's lid sealed closed with the sampling attachment omitted.
Figure 16:
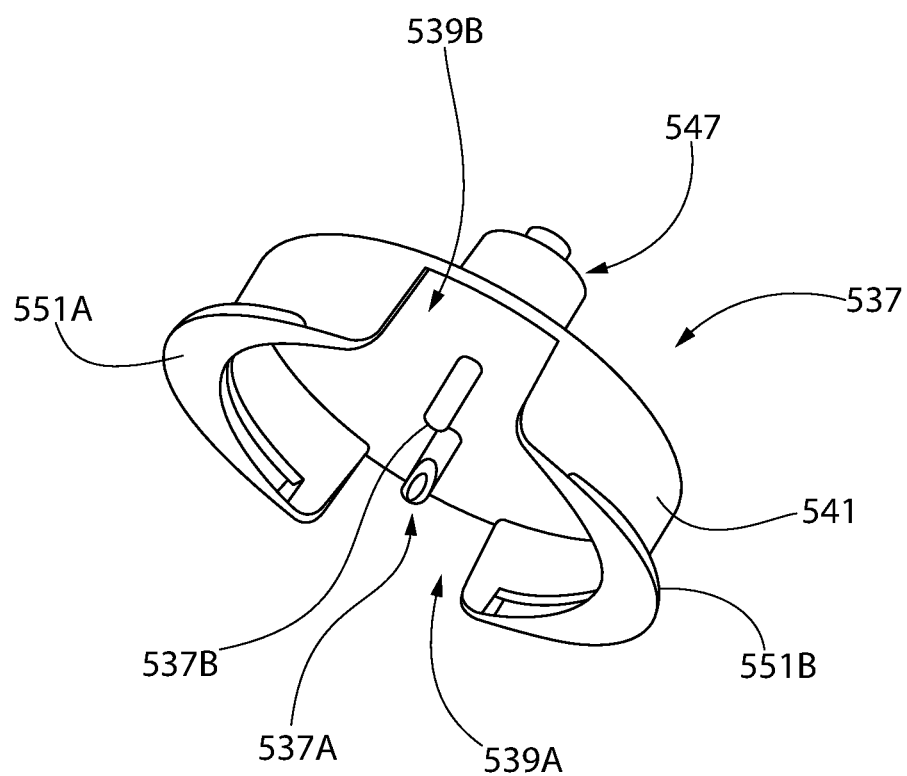
FIG. 16 is an isometric view of the sampling attachment showing the two sharps.
Figure 17:
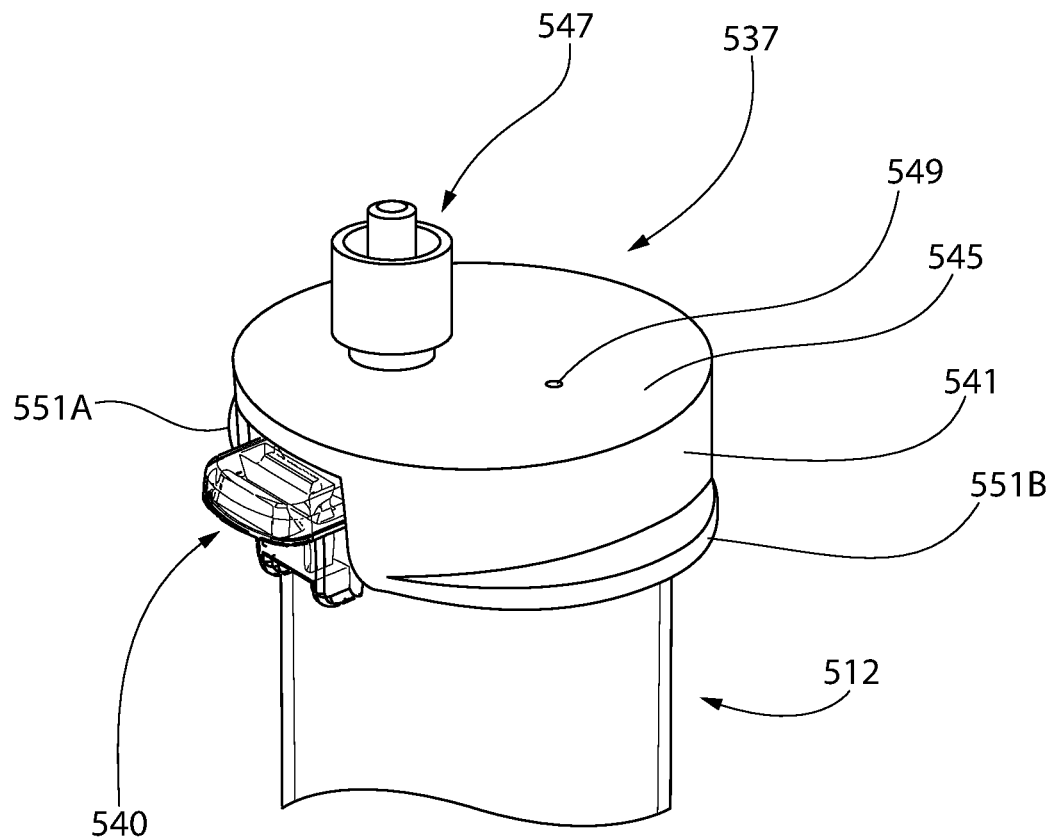
FIG. 17 is a partial view of the sixth embodiment showing the sampling attachment installed on the lid of the container.

The distinction of the vial 500 is with regard to its lid base 532, as shown most clearly in FIGS. 13 and 15. In particular, the lid base 532 comprises a raised elliptical formation 535 (e.g., polypropylene) that comprises a pair of septa 535A and 535B. These septa 535A/535B may comprise thermoelastic polymer (TPE) and serve as the fluid transfer passageway and a vent, respectively, as described below. An injection port 535C is shown in between the septa 535A/535B; this injection port 535C is used to generate a raised elliptical formation 535.

A sampling attachment 537 (FIGS. 13-18) is provided with the vial 500 and is secured over the lid 518 edge in using a releasable friction-fit or snap configuration. Cutouts 539A and 539B are provided in the skirt 541 portion of the attachment 537 to allow the attachment 537 to releasably couple to the lid 518. As shown most clearly in FIG. 16, a pair of sharps 537A and 537B are fixedly secured to an underside 543 of a top surface 545 of the attachment 537. Thus, when the attachment 537 is positioned properly on top of the lid 518 and pressed downward to releasably secure to the lid 518, the sharp 537A punctures the septum 535A and the sharp 537B punctures the septum 535B. The sharp 537A is in fluid communication with a Luer adapter 547 whereas the sharp 537B is in fluid communication with a vent hole 549 in the top surface. The operator then connects either a mating Luer lock adapter needle assembly (FIG. 1A) or a Luer lock adapter sterile tubing (FIG. 1B) to the Luer adapter 547 to initiate the fluid sampling transfer. When that transfer is complete, the operator need only to disconnect the mating Luer lock adapter needle assembly (not shown) or a Luer lock adapter sterile tubing (also not shown) from the Luer adapter 547. Next, the operator removes the sampling attachment 537 and discards it. Because the septa 535A/535B are self-sealing, the removal of the sampling attachment 537 from the lid 518 does not compromise the seal of the vial 500. The sampling attachment 537 comprises diametrically-opposed lips 551A/551B to assist the operator in connecting/disconnecting the attachment 537 to the lid 518.

Figure 18:
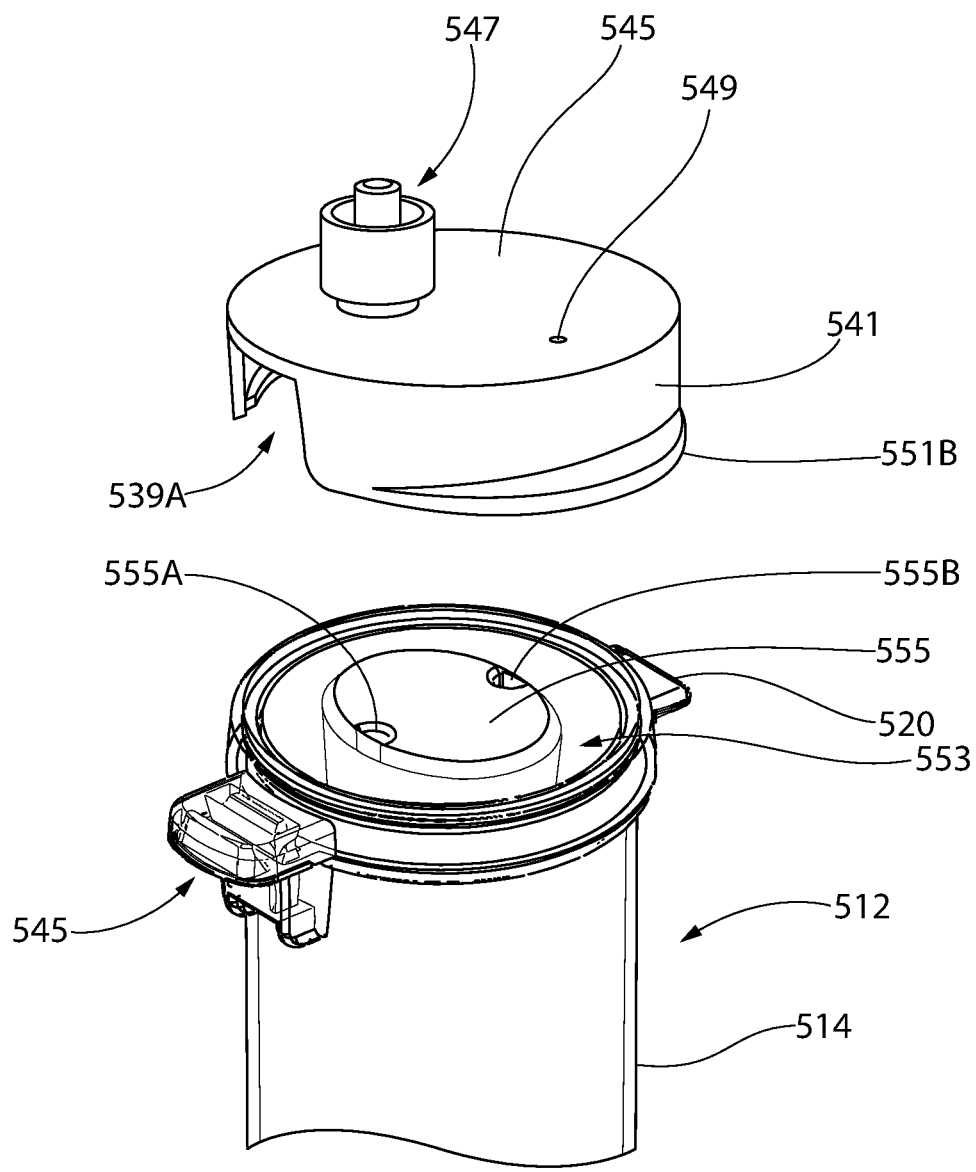
FIG. 18 is an exploded view of an alternative septum configuration for the sixth embodiment that avoids "coring" of the septum by the sharps.
Figure 19:
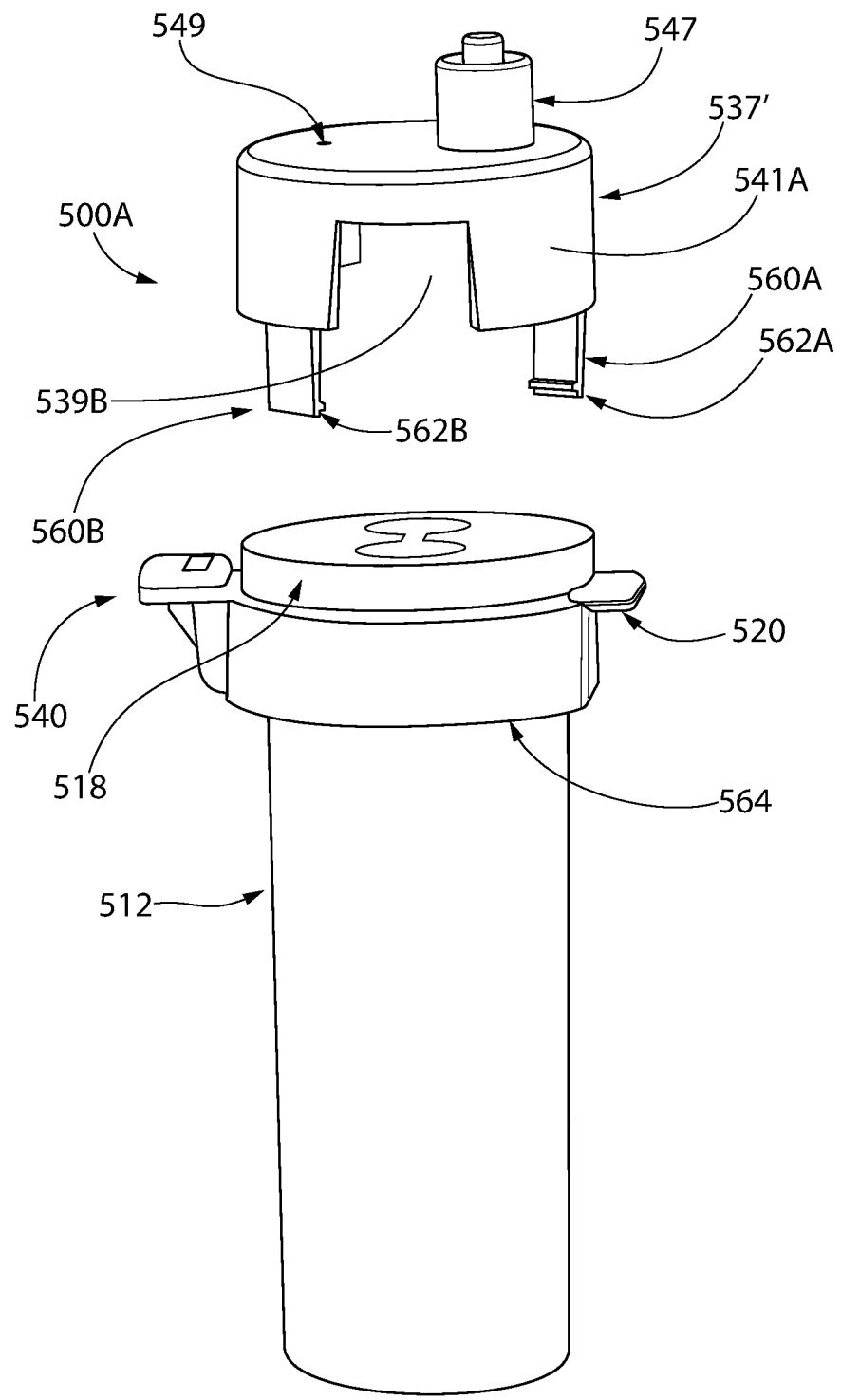
FIG. 19 is an isometric exploded view of a variation of the sixth embodiment which utilizes a rotatable sampling attachment.

In some cases, the use of large diameter sharps (e.g., 18 gauge or greater) could cause "coring" of the septa 535A/535B, thereby compromising the seal of the vial 500. To that end, FIG. 18 depicts an alternative to the use of two septa. In particular, the lid base 532 comprises a raised circular formation 553 which houses a single septum 555 that comprise diametrically-opposed cavities 555A/555B along the perimeter or edge of the septum 555, at an interface between the septum 555 and the raised circular formation 553. Although not shown, the base of these cavities comprises the TPE of the septum 555 so that the seal remains closed. When the sampling attachment 537 is secured to the lid 518, a respective sharp 537A and 537B, rather than piercing the septum 555, enters a respective cavity 555A/555B and displaces a respective portion of the perimeter of the septum 555 away from the raised circular formation 553 (i.e., inwardly toward the center of the septum 555), thereby allowing the sharps 537A/537B to communicate with the vial interior space 524. Sample fluid transfer occurs as described previously. When the sample fluid transfer is complete, the sampling attachment 537 is disconnected from the lid 518 and discarded. As such, any coring of the septum 555 is thereby avoided.

Figure 14A:
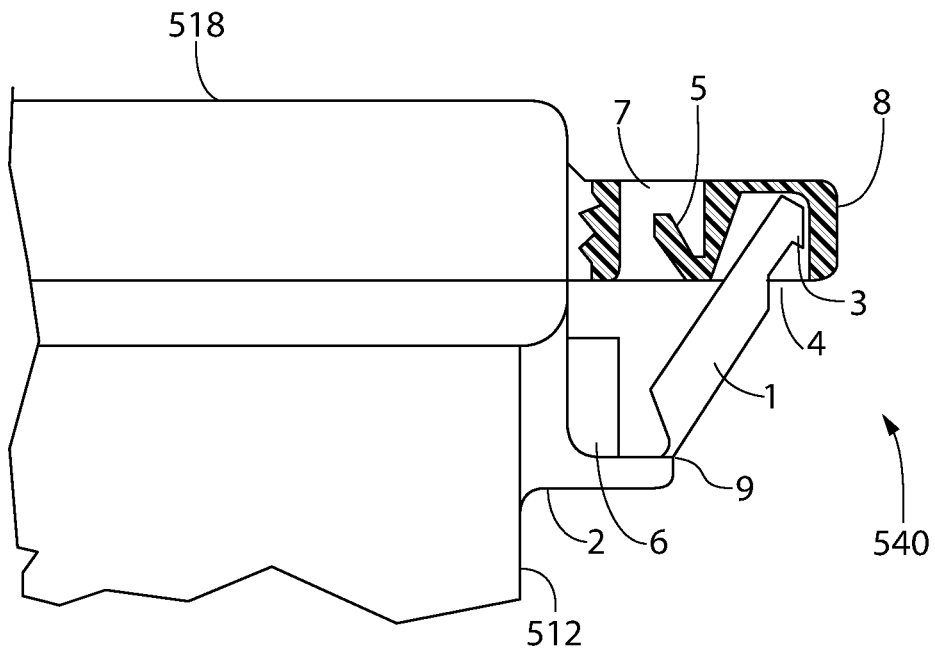
FIG. 14A is a partial cross-sectional view of an exemplary tamper evident mechanism shown before it is enabled, i.e., before the lid is sealed closed.
Figure 14B:
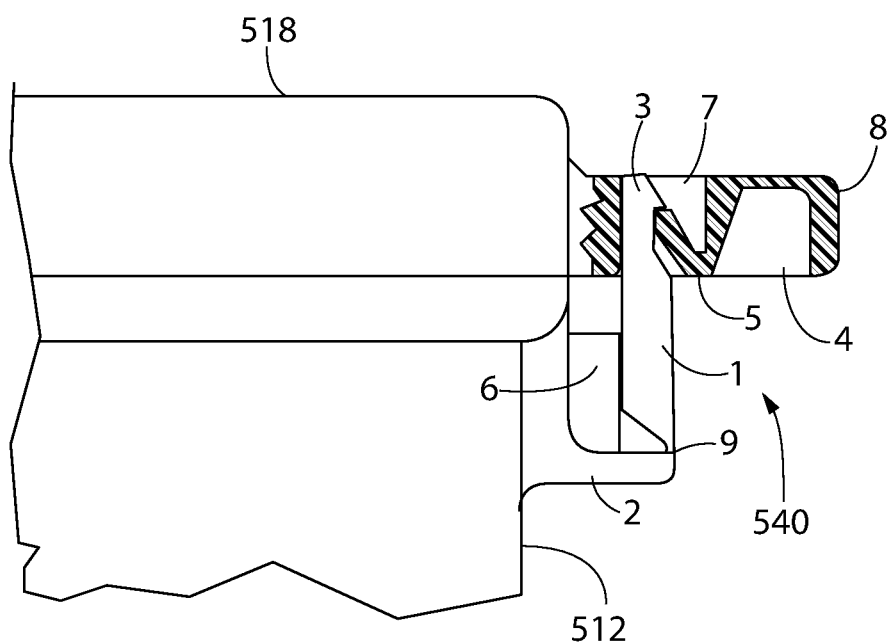
FIG. 14B is a partial cross-sectional view of the exemplary tamper evident mechanism of FIG. 14A shown in its enabled condition, i.e., with the lid sealed closed.

By way of example only, the tamper-evident mechanism 540 is shown in FIGS. 14A-14B. As shown in FIG. 14A, the detachable protrusion 1 has a base 2. The protrusion 1 has a contact element 3 and a break point 9. In the empty stage of the container 512, the contact element 3 of the protrusion 1 is situated in the first slot 4 of the tab 40 of the lid 518. It is understood that other designs of first slot 4 are contemplated. The only design requirement of first slot 4 is that it serves the purpose of holding protrusion 1 in place during handling and prior to the filling stage. As such, protrusion 1 is protected from accidentally being torn off prior to engaging protrusion 1 with interlocking device 5. There is a space between the protrusion 1 and a stop rib 6 and a second slot 7 with the interlocking device 5 remaining empty.

FIG. 14B illustrates the container 512 and lid 518 of the present invention in the filled stage. The lid 518 is placed upon the container 512 and the protrusion 1 is repositioned with the second slot 7. The contact element 3 of the protrusion 1 engages the interlocking device 5 of the second slot 7 of the tab 8 to form a tamper-proof seal. The stop rib 6 restricts the movement of the protrusion 1. It is understood that the design of break point 9 is such that, when sufficient frontal upward force is applied to the lid 518 to open the vial 512, the protrusion must fail (e.g., break) at break point 9 prior to any failure between the engagement of protrusion 1 with interlocking device 5. Consequently, the break point 9 width is sufficiently narrow to break when sufficient frontal upward force is applied to open the vial while, at the same time, is sufficiently flexible and of suitable design to allow for: (a) protrusion 1 to be moved from the first slot to the second slot without breakage; and (b) protrusion 1 to remain engaged with interlocking device 5 while sufficient force is applied to open the vial and break at break point 9. As a result, when the sufficient frontal upward force is applied and the break point 9 is severed, a visual indication is provided to the user that the container has been opened/tampered with.

Figure 21:
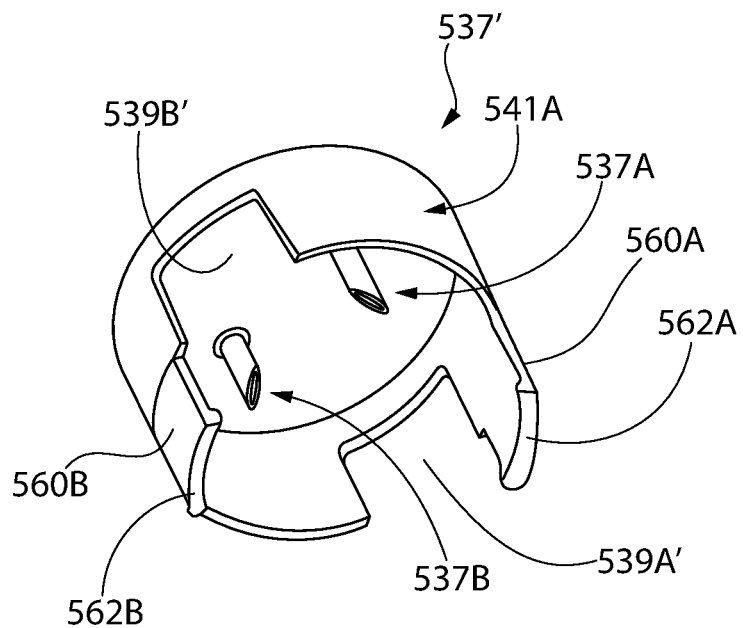
FIG. 21 is an isometric view showing the inside of the rotatable sampling attachment of FIG. 19.
Figure 21A:
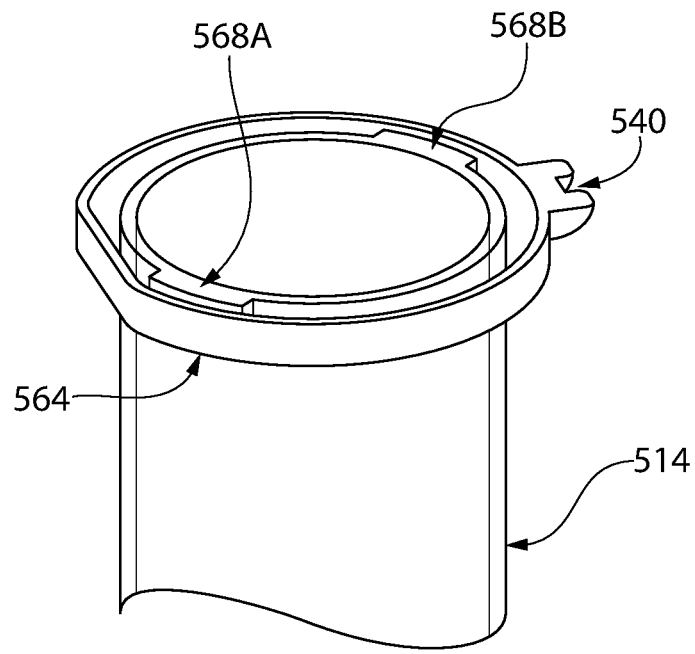
FIG. 21A is a partial cross-sectional view of the sampling vial of FIG. 20 showing the location of the vial undercuts with respect to the ring portion.
Figure 21B:
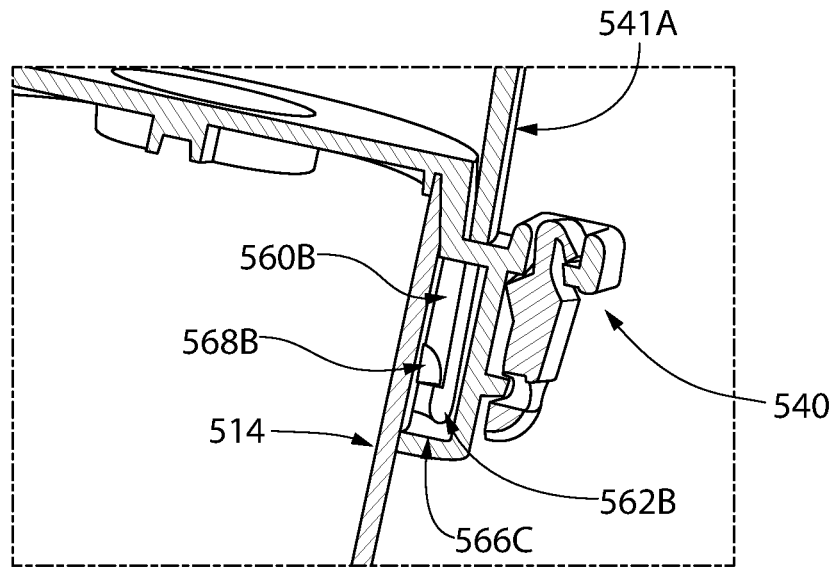
FIG. 21B is a partial cross-sectional view of the sampling vial of FIG. 20 showing the one vial undercut engaging an appendage undercut that prevents removal of the sampling attachment from the vial when the sampling attachment is in the open position.
Figure 22:
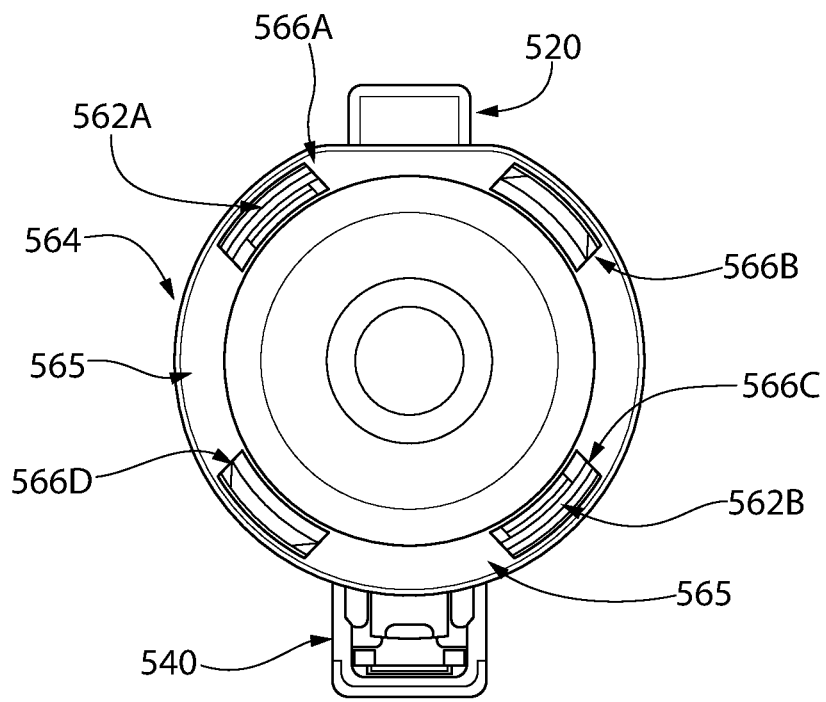
FIG. 22 is a bottom view of the variation of FIG. 19 showing the apertures in the ring that permits rotatable sampling attachment to puncture the septa only when the ring appendages are aligned with the apertures.

FIGS. 19-22 depict a variation 500A of the sixth embodiment 500 whereby the sampling attachment is rotatable and then displaceable along a body axis A (FIG. 20) to pierce the septa 535A/535B. In general, the variation 500A utilizes the identical vial 512 and closure 518 in accordance with FIGS. 13-18; as such, the discussion of the vial 512 is not repeated hereinafter. In particular, the sixth embodiment 500 and the variation 500A differ with regard to the sampling attachment 537' and a corresponding ring 564 positioned or formed around the vial 512. As shown most clearly in FIG. 19, the sampling attachment 537' comprises a pair of opposing appendages 560A/560B that project downward from the attachment skirt 541A. A pair of opposing cutouts 539A' and 539B' are formed in the skirt 541A which comprise the sharps 537A/537B (see FIG. 21). The ring 564 comprises a circular member that surrounds an upper portion of the vial 512 and is displaced away from the outer surface of the vial 512 by a floor 565 (FIG. 22), thereby forming a guideway into which the distal ends of the appendages 560A/560B are positioned. At discrete locations along the floor 565, are two pairs of opposing apertures 566A/566C and 566B/566D (FIG. 22). When the variation 500A is delivered in the open position (FIG. 20), the appendages 560A/560B are positioned over the first set of apertures 566A/566B but appendages do not pass through these apertures since the bottom edge of the attachment skirt 541A rests on the TE mechanism 540 and the hinge 520 (see FIG. 20). To prevent the sampling attachment 537' from being pulled upward and away from the vial 514 in this open position, a pair of vial undercuts 568A/568B are formed in the outer surface of the vial 514 aligned with apertures 566A/566C, as shown most clearly in FIG. 21A. Each distal end of the appendages 560A/560B comprise undercuts 562A/562B that engage vial undercuts 568A/568B respectively (only one of which is shown in FIG. 21B), thereby preventing the sampling attachment 537' from being pulled away from the vial 514

Figure 20:
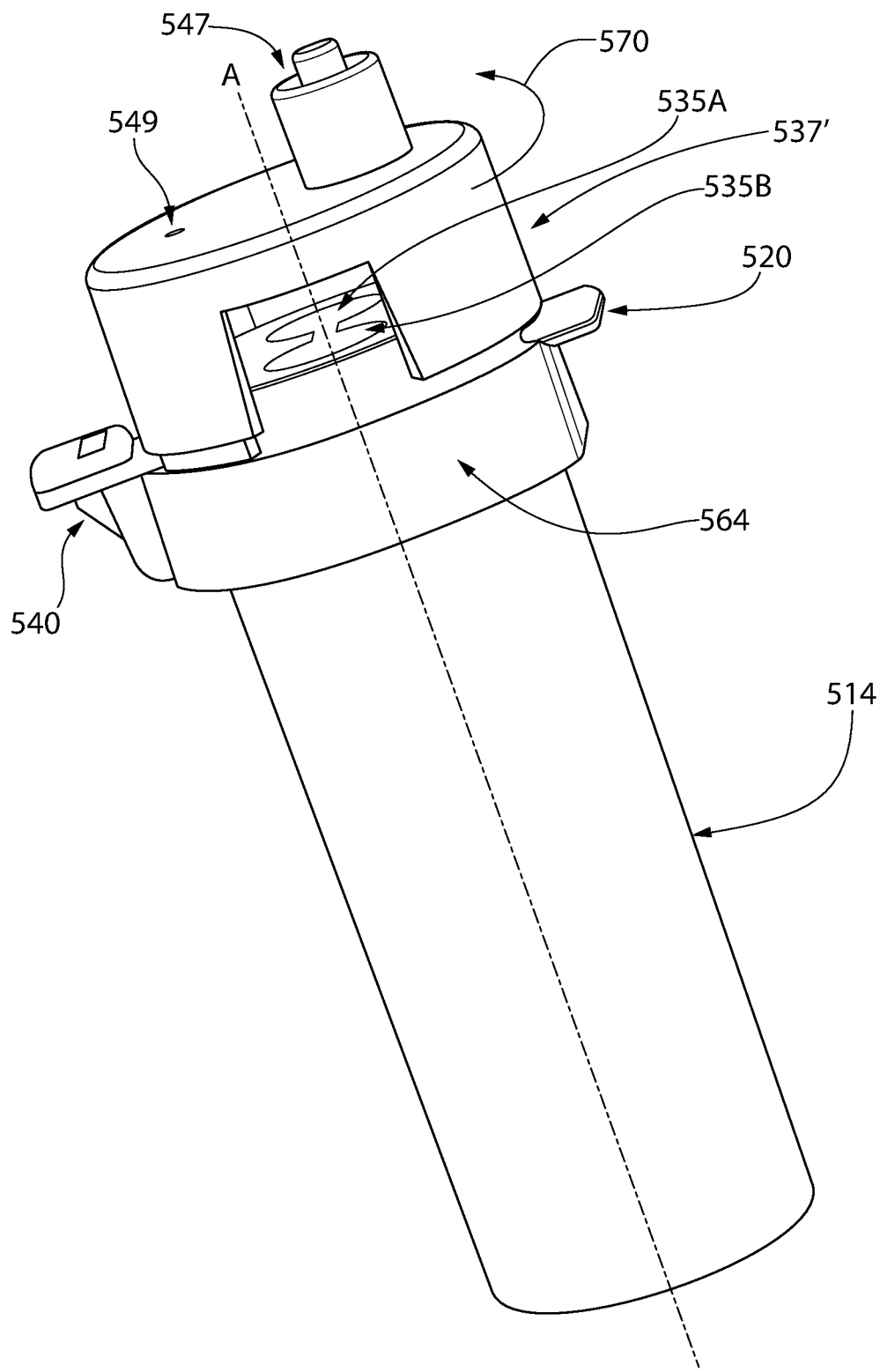
FIG. 20 is an isometric view of the variation of FIG. 19 showing the rotatable sampling attachment rotatably disposed on the sampling vial.

Use of the variation 500A is carried out when the vial is delivered in the open position as shown in FIG. 20. The user then couples the corresponding Luer lock adapter needle assembly (FIG. 1A) or sterile tubing (FIG. 1B) to the Luer lock adapter 547 and then rotates the sampling attachment 537' counterclockwise (arrow 570 in FIG. 20) until the cutouts 539A'/539B' are aligned with the hinge 520 and TE mechanism 540, respectively. At this position, the appendages distal ends pass through the apertures 566B/566D permitting the sampling attachment 537' to descend along the vial axis A, and with the application of slight pressure by the user, the sharps 537A/537B pierce the respective septa, as discussed earlier with regard to the sixth embodiment 500.

Figure 23C:
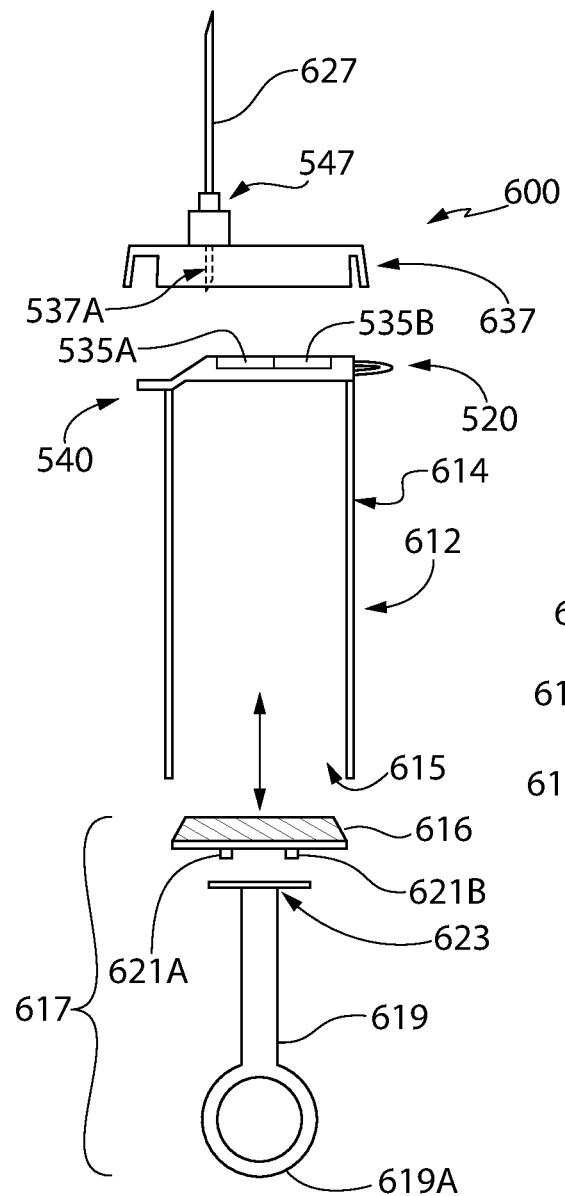
FIG. 23C is an exploded view of the seventh embodiment showing a needle coupled to the Luer lock adapter of the seventh embodiment.
Figure 23D:
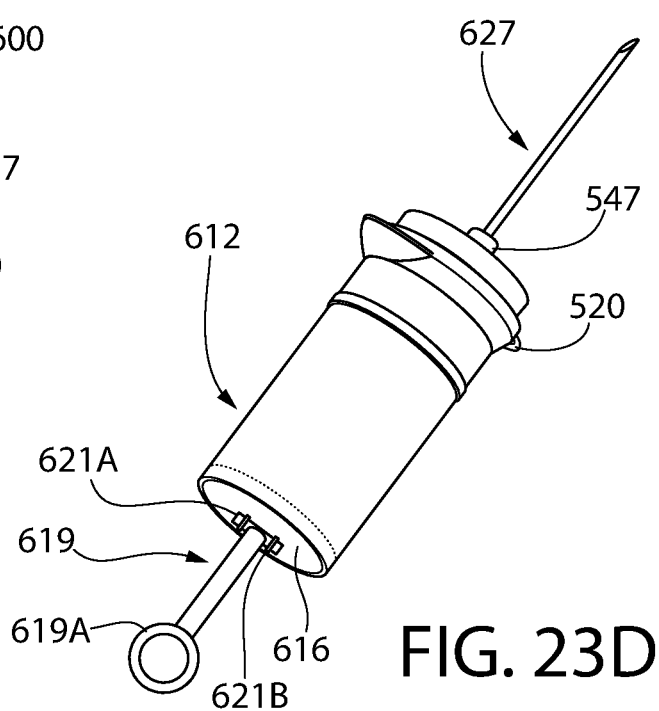
FIG. 23D is an isometric view of the device of FIG. 23C.
Figure 23E:
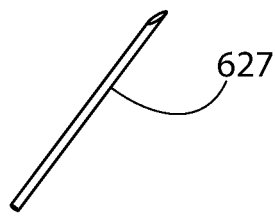
FIG. 23E is a view of an exemplary needle used in the device of FIGS. 23C-23D.
Figure 23F:
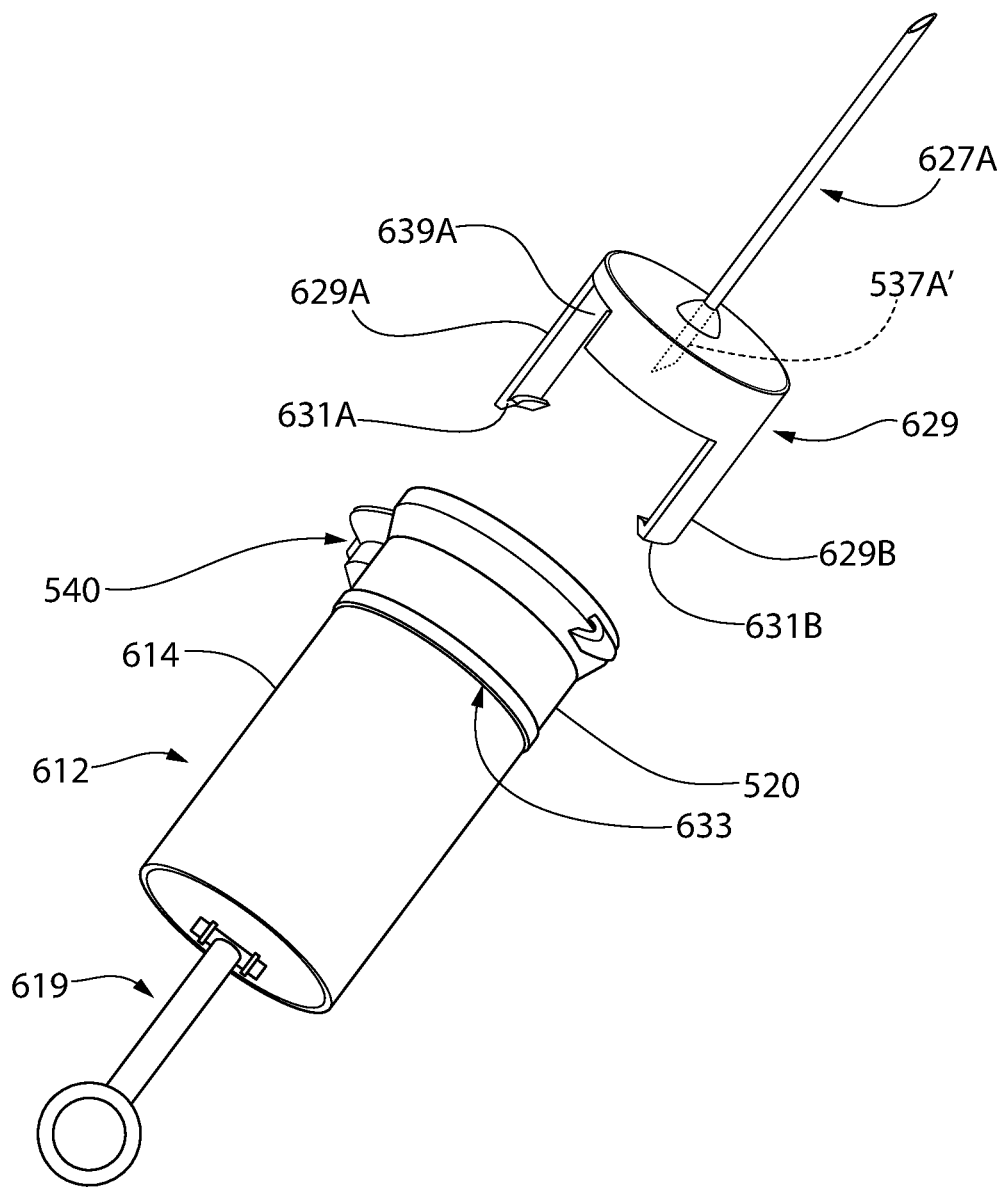
FIG. 23F is a variation that uses a needle adapter in place of the Luer lock for the device of the seventh embodiment.
Figures 23G, 23H:
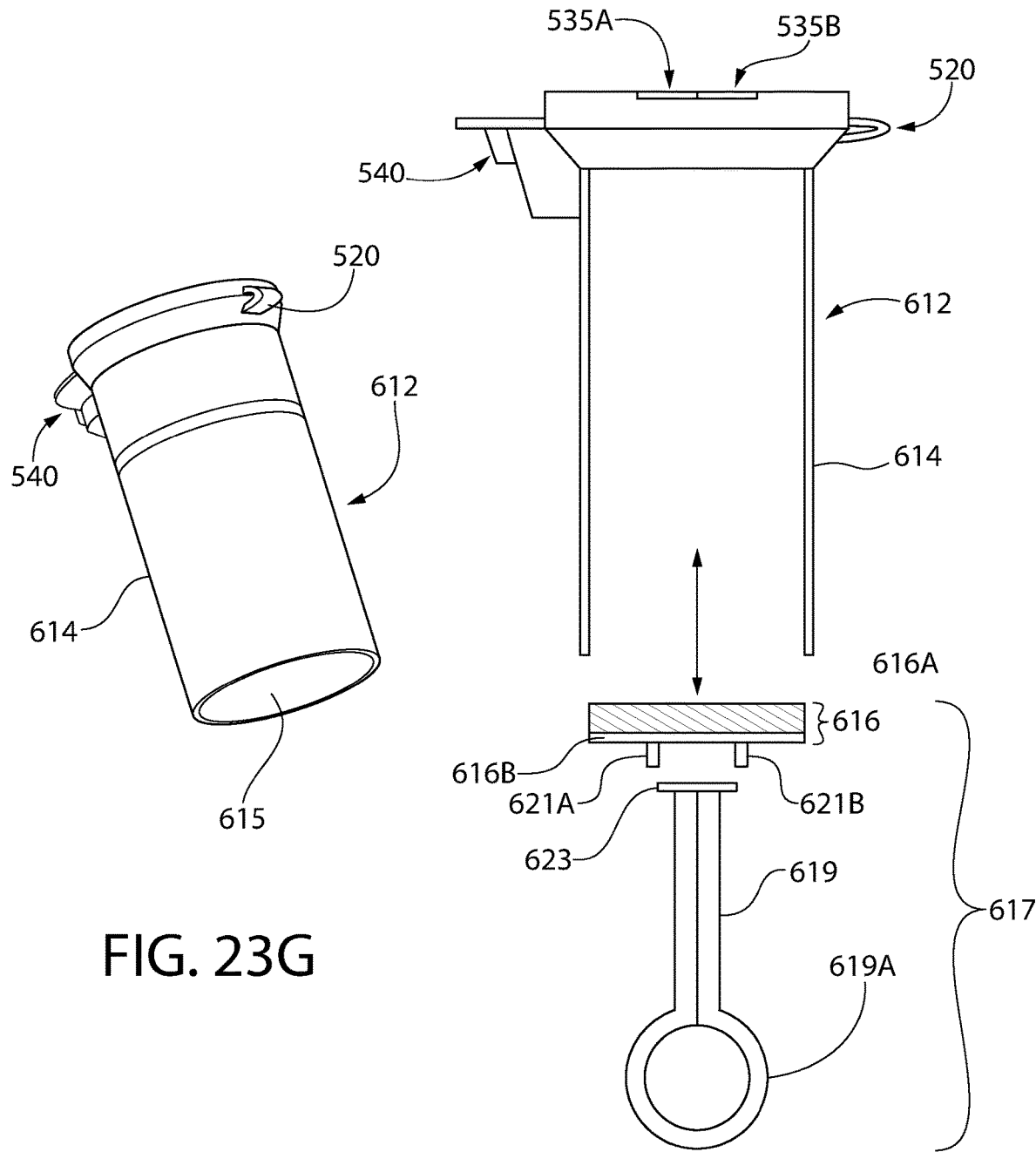
FIG. 23G is an isometric view of a vial or container of the seventh embodiment showing an open bottom state.
FIG. 23H is an exploded view of the seventh embodiment that depicts the dual layer of the displaceable bottom wall.
Figure 23I:
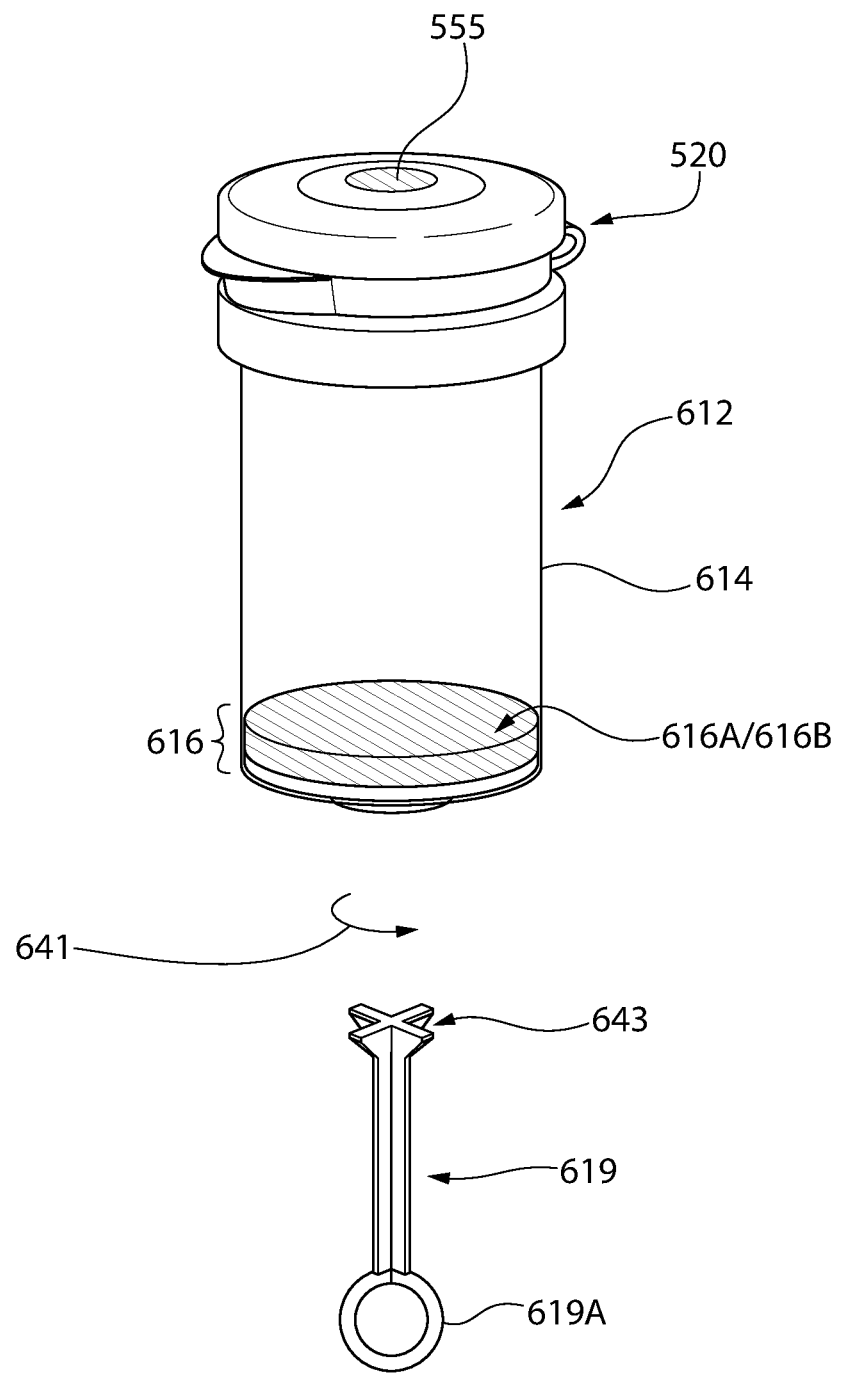
FIG. 23I is an isometric view of the seventh embodiment similar to the device FIGS. 23G-23H.

FIGS. 23-23I depict a seventh embodiment of an aseptic tamper-evident sampling vial 600 that utilizes a removable bottom. As described below, with reference to drawings provided below, an alternative embodiment of the present invention may incorporate substantially all features of any of the sampling vials 10, 100, 200, 300, 400, 500 and 500A described and illustrated in the present application. This alternative embodiment is configured for use in applications where it is preferred not to use a separate syringe mechanism to aseptically transfer the sample from a source to the vial. More particularly, this alternative embodiment provides the vial as a syringe itself, in other words, a vial comprising an internal syringe mechanism. The vial is configured to aseptically withdraw the sample from a source and directly transfer it into the vial 600.

The vial 600 (e.g., a 2 oz. vial) is provided in its unused state with an open bottom. In particular, the vial body 612 has tubular sidewall 614 with an open bottom 615 as shown in FIGS. 23-23A. A plunger assembly 617 is disposed with the vial 612 at its open bottom 615. In particular, the plunger assembly 617 is formed by a displaceable bottom wall 616 having a driver 619 coupled thereto. The bottom wall 616 is slidable within the vial body 614 from an initial position, wherein the bottom wall 616 is disposed within an upper area of the vial body 614 to a final position, wherein the bottom 616 is permanently secured to a lower section of the vial body 614. For example, the bottom wall 616 may lock into place, e.g., by snap-fit engagement, in the final position. A user may grip the driver 619 by its ring 619A to translate the bottom wall 616 from the initial position to the final position. By way of example only, the bottom wall 616 may comprise clasps 621A/621B for receiving respective sides of a T handle portion 623 of driver 619.

The vial 600 is similar to embodiment 500 at its upper end having the tamper evident mechanism 540, hinge 520 and septa 535A/535B or 555. The sampling attachment 647 is similar to the sample attachment 547 discussed previously except that there is no vent hole and therefore no corresponding sharp 537B.

FIGS. 23-23B depict one variation of the vial 600 having an internal syringe mechanism. To use the device shown in FIGS. 23-23B, one may: (a) pierce the septum; (b) draw a sample by pulling on the driver 619 in a withdrawing syringe motion; (c) keep drawing until the bottom wall 616 locks into place; and (4) optionally remove the sampling attachment 637. This will provide the user with a filled aseptic 2 oz. sample vial. Optionally, the vial 612 is TPE lined.

By way of example only, the bottom wall 616 may be locked in place by use of a pair of rings 615A/615B (FIG. 23A) formed on the inside surface of the container 614 at different elevations from the bottom edge of the container. The bottom wall 616 can be initially located above the ring 615A and once the driver 619 is installed pulled downward to draw in the fluid sample, once the bottom wall 616 is pulled past the first ring 615A (in a ratchet-type configuration), the bottom wall 616 is then locked in between the rings, establishing a one-time use mechanism.

Another variation involves securing a syringe needle 627 or other cannula to the Luer lock 547 as shown in FIGS. 23C-23E. In this variation, the syringe needle 627 or other cannula provide a connection between the ambient environment or sample source and the vial space superior to the bottom wall 616.

With a syringe needle 627 secured to Leur lock 547 on the sampling attachment 637 of the vial 612, moving the bottom wall 616 from the initial position to the final position, via a withdrawing syringe motion, creates negative pressure within the vial 612. This in turn creates a flow path between the sample source (not shown) and the vial 612, to facilitate transfer of the sample from the sample source into the vial 612, through the needle 627. In this way, the vial 600 functions initially as a syringe and then, when the bottom wall 616 is in its final position, the vial 600 is transformed into a sample vial (where the syringe function is no longer applicable). By way of example only, the syringe needle 627 may comprise a 2-shot hard tip needle (e.g., 1.5-2 inches) or it may comprise a flexible needle.

A further variation of the vial 600 replaces the sampling attachment 637 with a needle adapter 629 as shown in FIG. 23F. In particular, the needle adapter 629 comprises a built-in 146-needle 627A and the corresponding sharp 537A'. Opposing appendages 629A/629B having respective undercuts 631A/631B that capture around a vial ring 633 surrounding the upper portion of the vial body 612. As with the sampling attachment 637, the needle adapter 629 comprises cutouts (only one of which 639A is shown) that permit the needle adapter 629 to seat properly on top of the vial 612 by clearing the TE mechanism 540 and hinge 527 while permitting the sharp 537A' to pierce the septum.

Thus, all of these foregoing variations of the embodiment 600 may include a hole, syringe needle, or other cannula, providing a connection between the ambient environment or sample source and the vial space superior to the bottom wall 616. Furthermore, it should be noted that the cannula can comprise metal attached via the sampling attachment 637 or the needle may comprise plastic and affixed permanently.

Another variation of the vial 600 is shown in FIGS. 23G-23H wherein the bottom wall 616 includes a TPE portion 616A secured or molded to a polymer portion 616B (e.g., polypropylene (PP), to enhance the drawn function of the syringe plunger assembly 617.

A further variation of the vial 600 is shown in FIG. 23I wherein the bottom wall 616 (viz., TPE portion 616A/PP portion 616B) is sealed in a leak tight and sterile closed position. The driver 619 can be disengaged by reversing the process described earlier for engaging the driver to the bottom wall 616; alternatively, the driver 619 may have an engagement end 643 whereby twisting the driver 619 in the direction shown by arrow 641 results in the driver 619 being disengaged from the bottom wall 616. Although not shown, the engagement end 643 may be received in a guideway(s) (rather than the clasps 621A/621B discussed previously) on the underside of the bottom wall 616; this guideway allows the driver 619 to be releasably snap-locked to the bottom wall 616 or disengaged therefrom. By disengaging the driver 619 from the bottom wall 616, the vial 600 may be used normally (e.g., stood on a surface by resting the bottom wall 616 against that surface). The further variation of the vial 60 shown in FIG. 23I may be provided in a sterile package that is not opened until the time of use to maintain sterility inside the vial 600.

Figure 24:
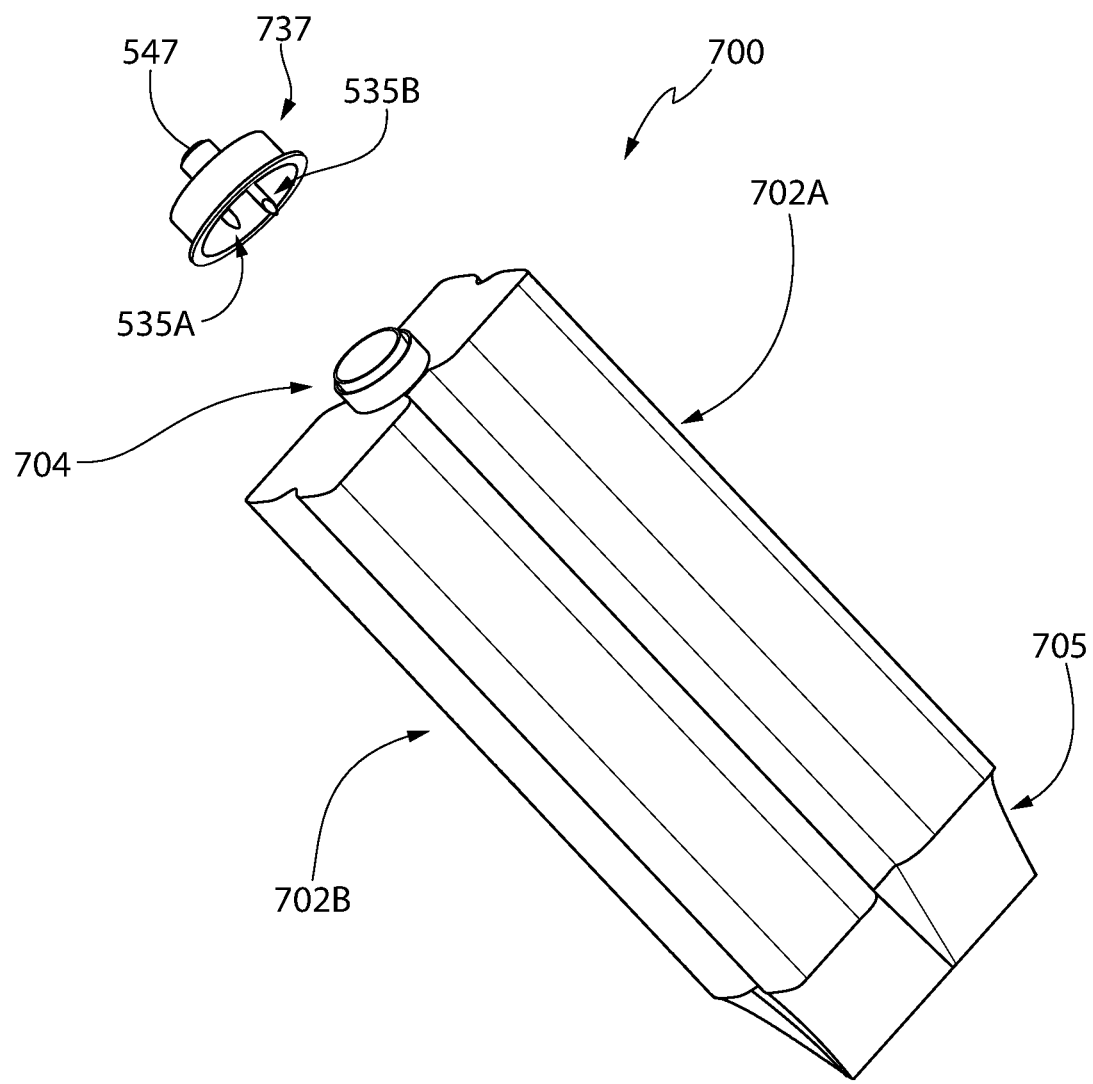
FIG. 24 is an exploded isometric view of an eighth embodiment of the aseptic sampling container for large volumes of liquid (e.g., 1500 mL) and its associated sampling attachment.

FIG. 24 depicts a seventh embodiment 700 of the present invention, namely, a large (e.g., 1500 mL) ampoule for use as an aseptic sampling container. As such, it is configured for using the same Luer lock adapter 547 discussed previously, as well as the needle (FIG. 1A) and/or tubing assembly (FIG. 1B), also discussed previously, for the two-ounce aseptic sampling container embodiments 100-600.

In particular, the embodiment 700 is two shot injection molded to form two compartments 702A and 702B. Unlike the previous aseptic sampling containers which included a flip top lid (as evidenced by the hinge 520 and TE mechanism 540), this container 700 has not such flip top lid. Instead, a port 704 comprises the two TPE septa 535A and 535B (FIG. 24B) and the port 704 is designed to accept the existing Luer lock adapter 737 (FIGS. 24 and 24A) that has the double sharps (i.e., needle) 537A/537B, i.e., one for the liquid orifice and the other for the container vent 549. It should be noted that because there is no flip top lid in the embodiment 700 (and no hinge 520 or TE mechanism 540), the adapter 737 requires no cutouts as does adapter 537. To use the embodiment 700, the user twists the adapter 737 onto the port 704 and then depresses it to penetrate the TPE ports 535A/535B with the Luer lock adapter two plastic needles 537A/537B. The Luer lock adapter 737 would have either a needle attached via the Luer lock or a tubing assembly that can be connected to a pump (e.g., peristaltic), none of which is shown. Once the container 700 accepts the desired volume, the user removes the Luer lock adapter 737 which retracts the two plastic needles 537A/537B from the TPE ports 535A/535B and the sample is now contained. To retrieve a sample from the container 700, the user can pierce the TPE port 535A to retrieve the desired volume.

The embodiment 700 is injection molded with the bottom 705 open until post-molding. After it is molded, a heat clamp seals the bottom into the tapered formation to form a sealed container, as shown in FIGS. 24 and 24C. It should be further noted that the port 704 may comprises bottle threads on the round cylindrical top to accept a TE cap if the user would like the assurance of the TPE ports having not been compromised.

It should be further noted that shields S are provided along the bottom portion of the vials 10 and 100 to prevent the user from encountering any needle sticks if a needle assembly (FIG. 1A) remains coupled to the free end of the rotatable arms when the arm is in the closed position. Similarly, a shield mechanism S1 is provided on the arm of the vials 200 for the same reasons.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

While the invention has been described in detail and with reference to specific examples thereof, it will be apparent to one skilled in the art that various changes and modifications can be made therein without departing from the spirit and scope thereof.

What is claimed is:

1. An aseptic container for collecting a fluid sample therein from a fluid source, said container comprising:
   a lid that is sealed closed to a container body and comprising a tamper-evident mechanism at an interface between said lid and said container body, the tamper-evident mechanism including a detachable protrusion configured to be moved from a first slot to a second slot;
   at least one septum that forms a portion of said lid;
   an attachment that is positioned over said lid and having a pair of lumens that interact with said at least one septum to form a fluid passageway and a vent, respectively, to an interior of said container body; and
   said attachment comprising a coupling for connecting the fluid source in fluid communication with one of said lumens that form said fluid passageway to support an aseptic fluid transfer from the fluid source to said container.

2. The aseptic container of claim 1 wherein said at least one septum comprises a pair of septa and wherein said pair of lumens comprises a pair of sharps and wherein said pair of sharps penetrate a respective one of said pair of septa.

3. The aseptic container of claim 2 wherein said attachment is rotatably coupled to said container body to permit said attachment to be rotated from a first state to a second state, said first state comprising said attachment being positioned away from said lid and said second state comprising said attachment being positioned against said lid such that said pair of sharps penetrate said respective one of said pair of septa.

4. The aseptic container of claim 3 wherein said attachment comprises opposing appendages that are movably received in a ring member secured to said container body, said ring member having at least one pair of apertures that permit distal ends of said appendages to pass therethrough to permit said attachment to be positioned against said lid in said second state.

5. The aseptic container of claim 4 wherein said container body further comprises a pair of undercuts on opposite sides of container body aligned with said ring member, said undercuts engaging said distal ends of said appendages to prevent said attachment from being disengaged from said aseptic container in said first state.

6. The aseptic container of claim 2, wherein an injection port is located in the septa between the pair of septa.

7. The aseptic container of claim 6, wherein the injection portion is configured to generate a raised elliptical formation around the pair of septa.

8. The aseptic container of claim 1 wherein said attachment is disposable.

9. The aseptic container of claim 1 wherein said lid is hinged to said container body.

10. The aseptic container of claim 9, wherein the tamper-evident mechanism is diametrically-opposed to the hinge.

11. The aseptic container of claim 1 wherein said at least one septum comprises a perimeter that forms a seal to said lid and wherein said lumens displace respective portions of said perimeter away from said lid to form said fluid passageway and said vent, respectively.

12. The aseptic container of claim 11 wherein said lid is hinged to said container body.

13. The aseptic container of claim 1, wherein the protrusion is configured to pivot from the first slot to the second slot.

14. The aseptic container of claim 13, wherein the protrusion is not configured to pivot from the second slot to the first slot.

15. The aseptic container of claim 1, wherein the protrusion is configured to be in the first slot when the container body is empty and in the second slot when the container body is at least partially filed.

16. The aseptic container of claim 1, wherein the tamper-evident mechanism includes a base attached to the container body and the protrusion is detachably connected to the base at a break point.

17. The aseptic container of claim 1, wherein the attachment includes a pair of diametrically-opposed lips extending outwardly from the attachment, the lips being configured to assist an operator in connector or disconnecting the attachment to the lid.

* * * * *